United States Patent

Morishita

[11] Patent Number: 6,052,148
[45] Date of Patent: Apr. 18, 2000

[54] VIDEO AND AUDIO DATA COMPRESSION SYSTEM

[75] Inventor: Takuya Morishita, Tokyo, Japan

[73] Assignee: NEC Corporation, Japan

[21] Appl. No.: 08/924,591

[22] Filed: Sep. 4, 1997

[30] Foreign Application Priority Data

Sep. 13, 1996 [JP] Japan .................................... 8-265502
Sep. 13, 1996 [JP] Japan .................................... 8-265503

[51] Int. Cl.[7] .................................................. H04N 7/26
[52] U.S. Cl. ............................................................ 348/384
[58] Field of Search ................................... 348/384, 390; 382/232; H04N 7/26

[56] References Cited

U.S. PATENT DOCUMENTS 5,633,654  5/1997  Kennedy ................................ 345/114
5,719,886  2/1998  Matsui .................................... 369/32
5,845,242  12/1998 Takahashi .............................. 704/212

FOREIGN PATENT DOCUMENTS 5-100912   4/1993   Japan .
6-083647   3/1994   Japan .
7-185596   7/1995   Japan .
7-284064   10/1995  Japan .
8-102141   4/1996   Japan .
81-181999  7/1996   Japan .
8-205076   8/1996   Japan .

Primary Examiner—Howard Britton
Attorney, Agent, or Firm—Ostrolenk, Faber, Gerb & Soffen, LLP

[57] ABSTRACT

A video and audio data compression system includes a compression processor which issues compression processing commands in a predetermined order, a further compression processor for performing the compression processing of moving pictures and sounds and an interpreter for interpreting the compression processing commands issued by the compression processor and controlling the further compression processor.

17 Claims, 18 Drawing Sheets

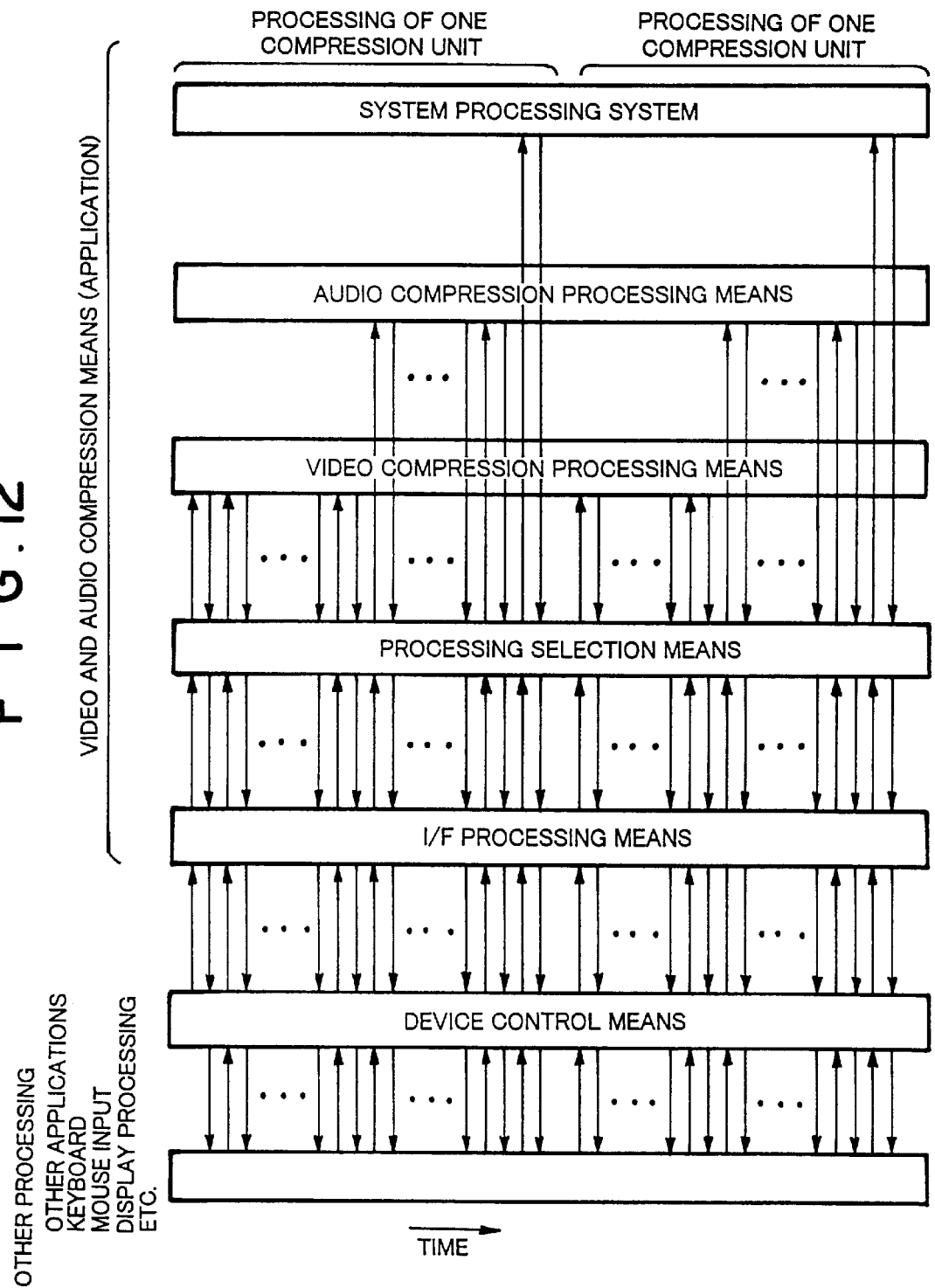

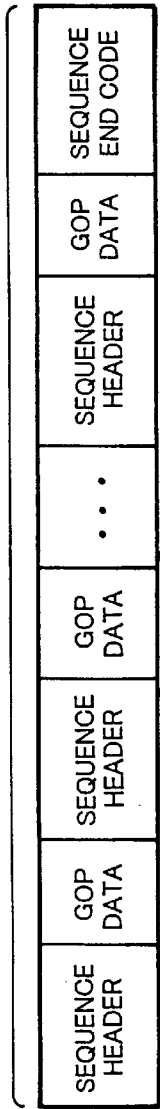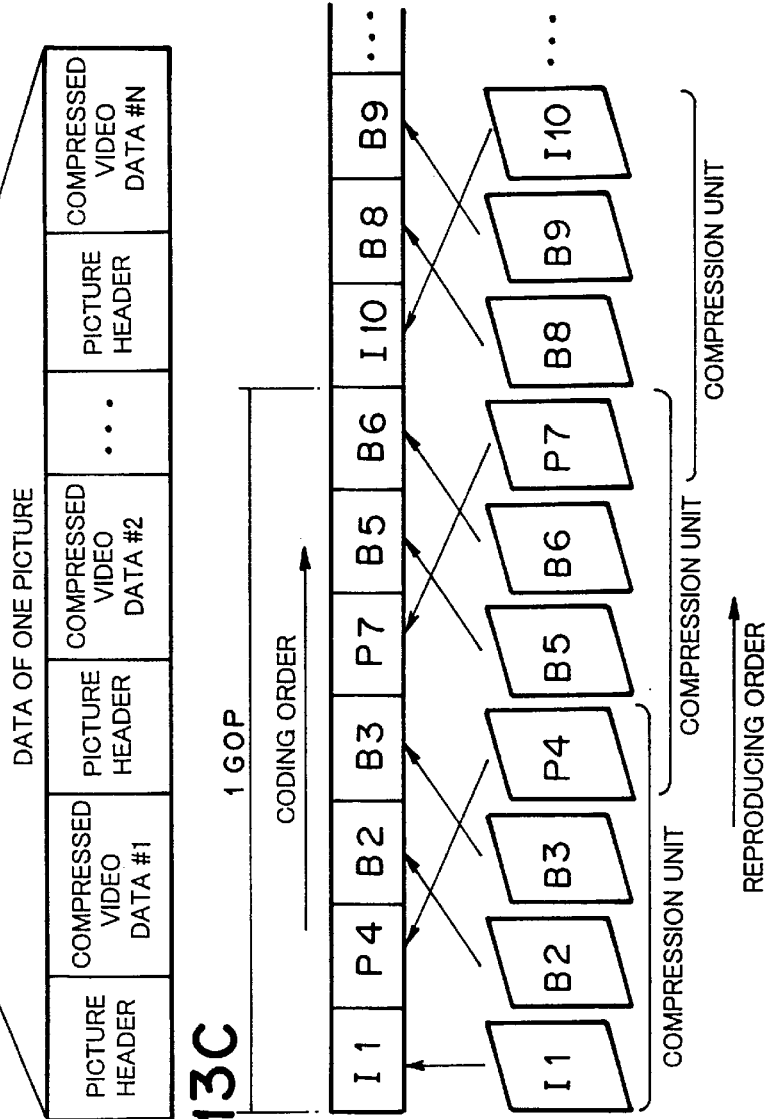
FIG. 13A
FIG. 13B
FIG. 13C

AAU: AUDIO ACCESS UNIT

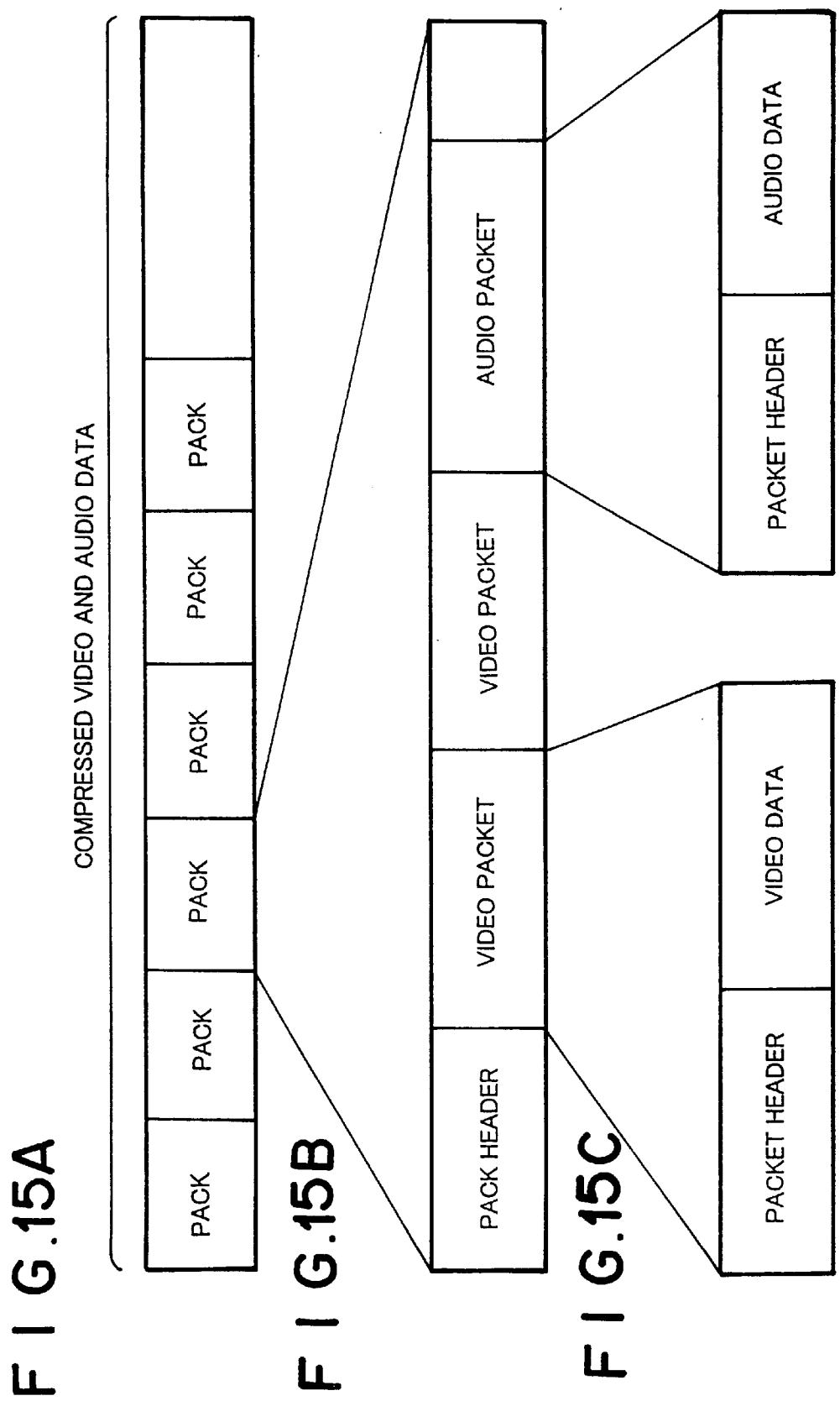

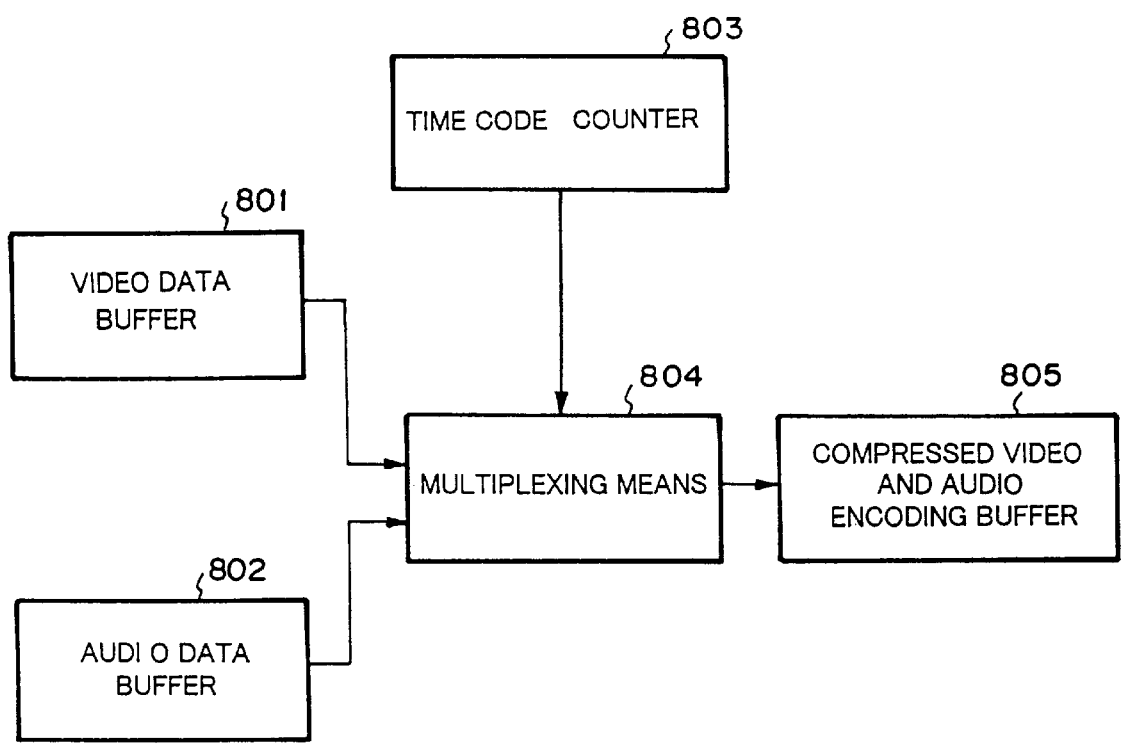
F I G .18

VIDEO AND AUDIO DATA COMPRESSION SYSTEM

BACKGROUND OF THE INVENTION

1. Field of the Invention

The present invention relates to a video and audio data compression system for compressing and coding moving pictures and sounds (hereinafter referred to as "video and audio data"), and particularly to a video and audio data compression system which is readily usable by another system.

2. The Related Art

As this type of video and audio data compression system, a video and audio compressing device is disclosed in Japanese Patent Application No. Hei-7-185596 which was not published at the time when the present application was filed in the Japanese Patent Office. According to this video and audio compressing device, moving pictures and sounds (video and audio data) are compressed in conformity with MPEG (Moving Picture coding Experts Group) which is widely used as a video and audio data compression system at present.

FIG. 11 is a block diagram showing the construction of a video and audio data compression system.

As shown in FIG. 11, the video and audio data compression system comprises device control means 1 for controlling the operation of plural applications, applications 2 and video and audio compressing means 5 which are controlled by the device control means 1, input means for inputting command data from a keyboard, a mouse or the like, and output means 4 for outputting a compression status to a display or the like.

The video and audio compressing means 5 comprises interface (I/F) processing means 10 for interfacing with the device control means 1, process selecting means 11 for determining which one of video data (moving picture) compression processing, audio data (sounds) compression processing and system processing should be selected and performed, video compression processing means 12 for compressing and coding the video data, audio compression processing means 13 for compressing and coding the audio data, system processing system 14 for integrating the compressed and coded video data and the compressed and coded audio data, compression target file device 15, and compressed file device 16.

FIGS. 13A to 13C are a diagram showing the construction of video data which are compressed and encoded in conformity with MPEG, wherein FIG. 13A shows a video sequence, FIG. 13B shows the structure of GOP (group of pictures), and FIG. 13C shows an arrangement of I, P and B pictures.

As shown in FIG. 13A, the video sequence starts from the sequence head at the head to GOP (Group of Pictures), ends with sequence end code, and includes one or GOP(s).

As shown in FIG. 13B, each GOP comprises one or more picture (s), and one picture represents one image (one frame). Three types of pictures are set as the type of pictures. A first type of picture is I picture (Intra-picture) is expandable on the basis of only its frame, a second type of picture is P picture (Predictive picture) which is expandable on the basis of preceding frames, and a third type of picture is B picture (Bidirectional Predictive picture) which is expandable on the basis of preceding and following frames. One GOP contains one or more I picture(s), and zero, one or more P picture(s) and B picture(s).

FIGS. 14A and 14B show the data structure of the audio data which are compressed and encoded in conformity with MPEG. FIG. 14A shows an audio sequence, and the audio sequence comprises plural AAU (audio Access Unit) as shown in FIG. 14A. Each AAU comprises an AAU header containing information on a synchronous word, a bit rate, a sampling frequency, etc., and compressed audio data as shown in FIG. 14B.

FIGS. 15A to 15C show the data structure of the video and audio data (moving pictures and sounds) which are compressed and encoded in conformity with MPEG. As shown in FIG. 15A, the video and audio data comprises plural packs, and each pack comprises one pack header and one or more packets as shown in FIG. 15B. The packets are classified into two types: video packets and audio packets.

As shown in FIG. 15C, each video packet comprises a packet header and video data, and the video data of respective video packets are extracted and continuously linked to one another to construct a video sequence.

As shown in FIG. 15C, each audio packet comprises a packet header and audio data, and the audio data of respective audio packets are extracted and continuously linked to one another to construct a audio sequence.

FIG. 16 shows the construction of the video compression processing means 12 shown in FIG. 11. As shown in FIG. 16, the video compression processing means 12 comprises video compressing control means 601 for controlling the entire video compression processing, original picture reading means 602 for reading original picture data from the compression target file device every compression unit, color signal converting means 603 for converting the original picture to a color signal format (YCrCb format) which is usable for MPEG, motion estimating means 604 for searching the motion between the picture of a preceding/following frame and the picture of the present frame on a block (the space area of 8 pels×8 pels in MPEG) basis, motion-compensated predicting means 605 for calculating the differential values between the pixel values of the blocks of the preceding/following frame and the present frame on the basis of the picture motion which is searched by the motion estimating means 604, DCT (Discrete Cosine Transform) means 606 for performing discrete cosine transform, quantizing means 607 for performing quantization, VLC means 608 for performing high efficiency variable-length encoding, a compressed code buffer 609 for storing video data which are compressed after VLC, dequantizing means 610 for performing dequantization, IDCT means 611 for performing inverse discrete cosine transform, motion compensating means 612 for adding the differential value and the pel (pixel) value of the block of the preceding/following frame to calculate a new reference frame, and a reference frame unit 613 for storing the picture of the preceding/following frame to be referred to.

The video compression is performed as follows. That is, as shown in FIG. 16, an original picture is read from the compression target file device every compression unit by the original picture reading means 602 to convert the read-in data to YCrCb data by the color signal conversion means 603, the motion between the preceding/following frame picture and the present frame picture is searched every block area, and then the compression of the present frame is started.

When the compression of I picture is performed, the pixel values of each block of the present frame are subjected to discrete cosine transform by the DCT means 606, quantized by the quantizing means 607, and then highly efficiently compressed to Huffman codes by the VLC means 608. The data thus compressed are successively stored into the compressed code buffer 609.

Next, in order to decode a compressed picture to regenerate a picture used as a reference picture, the quantized data are dequantized by the dequantizing means 610, subjected to inverse discrete cosine transform by the IDCT means 611, and stored in the reference frame unit 618.

Further, when the compression of P picture, B picture is performed, by the motion-compensated predicting means 605, the differential values are calculated between the pixel values of each block of the present frame and the pixel values of each block of the preceding frame or preceding/following frames which have been stored in the reference frame unit 613 and referred to on the basis of the motion searched by the motion estimating means 604. Thereafter, the differential values are subjected to the discrete cosine transform by the DCT means 606, then quantized by the quantizing means 607, and then highly efficiently compressed to Huffman codes. The data thus compressed are successively stored into the compressed code buffer 609.

Next, in the compression processing of the P picture, in order to regenerate a compressed picture used as a reference picture, the quantized data are dequantized by the dequantizing means 610, and then subjected to the inverse discrete cosine transform by the IDCT means 611 to calculate the differential values. The differential values are added to the pixel values of each block of the preceding frame which has been stored in the reference frame unit 613 and is referred to by the motion-compensated predicting means 604, and then the sum is stored in the reference frame unit 613.

The video compression control means 601 controls the entire series of compression processing as described above, and controls to temporarily intercept the compression processing at the interval of a constant time and restart it.

FIG. 17 shows the construction of the audio compression processing means 13 shown in FIG. 11. As shown in FIG. 17, the audio compression processing means 13 comprises audio compression control means 701 for controlling the entire audio compression processing, original sound data reading means 702 for reading out original audio data from the compression target file device, original audio data chop up means 703 for chopping up original audio data into AAUs, 32 frequency band mapping means 704 for performing frequency band mapping processing every AAU unit, psychoacoustic processing means 705 for performing psychoacoustic processing, quantizing and encoding means 706 for performing linear quantization and encoding, frame forming means 707 for adding encoded data with additive information to form compression data of one AAU, and compressed code buffer 708 for storing the compressed data formed in the frame forming means 707.

The audio compression is performed as follows. As shown in FIG. 17, audio data having the data amount corresponding to the reproduction time which is needed to reproduce the moving pictures (video data) compressed by the video compressing means are read out from the compression target file by the original audio reading means 702, and the data of one AAU (1152 samples in the case of MPEG audio layer 2) are chopped up from the read-in original audio data by the original audio data chop up means 703. The data thus chopped up are subjected to the following processing every AAU.

The 32 frequency band mapping means 704 divides an input signal into subband signals of 32 bands by a subband analyzing filter, and calculates a scale factor for each subband signal to normalize the dynamic range. The psychoacoustic processing means 705 performs fast Fourier Transform on the input signal and calculates apsychoacoustic masking by using the transform result to determine bit allocation to each subband. The quantizing and encoding means 706 performs the quantization and encoding processing according to the determined bit allocation. The frame forming means 707 adds a header and auxiliary information to the quantized and encoded subband signal, shapes a bit stream and stores it into the compressed code buffer 708.

The audio compression control means 701 controls a series of entire compression processing as described above, and controls to intercept the compression processing at the interval of a constant time or the processing time of one AAU and restart the processing.

FIG. 18 is a diagram showing the construction of the system processing means 14 shown in FIG. 11. As shown in FIG. 18, the system processing means 14 comprises a video data buffer 801 for storing compressed video data which are supplied from the video compression processing means 12, an audio data buffer 802 for storing compressed audio data which are supplied from the audio compression processing means 13, multiplexing means 804 for packetizing and packing the compressed video data and the compressed audio data, a time code counter 803 for adding time data to packs and packets, and a compressed video and audio code buffer 805.

As shown in FIG. 18, the system processing means 14 receives the compressed video code from the video compression processing means 12 and stores the compressed video code into the video data buffer 801. Further, it receives the compressed audio code from the audio compression processing means 13 and then stores the compressed audio code into the audio data buffer 802. The multiplexing means 804 chops up the compressed video code into packet size, adds a packet header and a pack header thereto, and further receives the reproduction time stamp from the time code counter 803 and adds the time stamp to the pack header and the packet header. Further, the multiplexing means 804 chops up the compressed audio code into packet size from the audio data, adds a packet header and a pack header, and further it receives the reproduction time stamp from the time code counter 803 and adds the time stamp to the pack header and the packet header. The packs thus formed are successively stored into the compressed video and audio code buffer 805.

The operation of the video and audio compressing device will be described hereunder with reference to FIG. 11.

First, when the start of the compression is instructed through the input means 3 by an operator, the video and audio data compression means 5 is invoked by the device control means 1. When the video and audio compressing means 5 is invoked, the control is shifted through the I/F processing means 10 to the processing selection means 11.

The processing selection means 11 first invokes the video compressing means 12. The video compression processing means 12 opens a compression target file which is indicated by the operator from the compression target file device 15 every several frames (one compression unit) to start the compression process of video data (moving pictures).

One compression unit of moving pictures corresponds to the GOP unit as described above or is set to a picture range from an I picture or P picture to the next I picture or P picture.

Next, when the control is shifted to the processing selection means 11, the audio compressing means 13 is invoked.

The audio compressing means 13 reads from the compression target file device 15 compression target file of audio data whose data amount corresponds to the reproduction time of the number of frames (one compression unit) which are processed in the video compression processing means 12, and starts the compression processing of audio data (sounds). In the case of the audio compression processing, the processing is returned to the processing selection means 11 after every completion of AAU processing as in the case of the video compression processing. When the last AAU in the compression unit of video data is completed, the audio compressing means 13 notifies to the processing selection means 11 that the system processing should be performed next.

The audio compression process may be more efficient when it is performed every AAU, and usually the audio compression processing is performed for the maximum number of AAUs within the time corresponding to one video compression unit. Further, for audio data whose data amount is smaller than the residual one AAU, the audio data are compressed when the control is shifted to the audio compression processing means 13 next time.

Next, when the processing is shifted from the audio compression processing means 13 to the processing selection means 11 for the last time in the video compression unit, the system processing means 14 is invoked. The system processing means 14 receives the compressed and encoded data of one compression unit which are generated in the video compression processing means 12 for one picture compression unit and the audio compression processing means 13 for several audio compression unit in one picture compression unit, packetizes and packs them so that the compressed video and audio code are synchronized with each other, and then writes them into the compressed data file.

The video data (moving pictures) compression process, the audio data (sounds) compression process, and the system process are performed every compression unit as described above.

In the above-described video and audio compressing device shown in FIG. 11, however, it is scarcely considered that the compression function of video and audio data is incorporated into another application having no compression function of video and audio data. Therefore, the video and audio compressing device has such a problem that it is difficult to incorporate the video and audio data compression function into another application. This is because if the video and audio data compression function should be incorporated into another application having no video and audio data compression function, expert knowledge is needed to form video, audio and system data according to the method as described above in the video and audio compressing device which is described with reference to FIG. 11, etc.

FIG. 12 is a diagram showing the processing flow in the device shown in FIG. 11, and shows the processing flow when another application 2 in FIG. 11 is selected as foreground application in the device shown in FIG. 11. In this case, another application can be smoothly operated by frequently shifting the processing from the I/F processing means 10 to the device control means 11. However, the video and audio data compression means 5 shown in FIG. 11 is constructed as one application, and thus if only the compression processing portion is separated from the application and incorporated in another application, complicated control is needed and thus expert knowledge is also needed.

SUMMARY OF THE INVENTION

Therefore, the present invention has been implemented in view of the foregoing problem, and has an object to provide a video and audio data compression system which enables the construction of a system for readily compressing moving pictures (video data) and sounds (audio data) even without certain knowledge of the compression of the video and audio data.

Further, the present invention has another object to provide a system which can be used to form an application of video and audio data compression even without expert knowledge and is improved in versatility.

According to the present invention, there is provided a video and audio data compression system comprising compression processing issuing means for issuing a compression processing command according to a predetermined order, a compression processing device for performing compression processing of moving pictures (video data) and sounds (audio data) (hereinafter referred to as "video and audio data"), and means for interpreting the compression processing commands issued from the compression processing issuing means to control the compression processing device.

According to a first aspect of the present invention, the means for controlling the compression processing device comprises means for interpreting the compression processing command issued from the compression processing issuing means to control the compression processing device, means for setting compression parameters for video and audio data, means for calculating and notifying the progression degree of the compression processing, and means for controlling input/output of the video and audio data.

In the first aspect of the present invention, the compression processing commands contain a compression parameter setting command for executing the setting of the compression parameters for the video and audio data, a compression start command for starting the compression processing of the video and audio data, a compression executing command for executing the compression processing of the video and audio data, and a compression end command for finishing the compression processing of the video and audio data.

Further, according to a second aspect of the present invention, the means for controlling the compression processing device comprises compression control means for interpreting the compression processing command issued from the compression processing issuing means to control the compression processing device, video compression control means for controlling the video compression processing, audio compression control means for controlling the audio compression processing, system processing control means for controlling system processing means for generating system data which allow synchronous reproduction of the video and audio data, and compression parameter setting means for setting the compression parameters for the video and audio data.

In the second aspect of the present invention, the compression processing commands contain a compression parameter setting command for executing the setting of the compression parameters for the video and audio data, a compression start command for starting the compression processing of the video and audio data, a video compression command for executing the compression processing of the video and audio data, an audio compression command for executing the compression processing of- the audio data, a system processing command for generating system data which allow synchronous reproduction of the video and audio data, and a compression end command for finishing the compression processing of the video and audio data.

The summary of the present invention will be described hereunder.

The present invention is characterized in that the compression control device is designed to collectively perform the control processing of the compression processing and the input/output processing of data, and more specifically, it comprises the compression processing issuing means (reference numeral 110 in FIG. 1, reference numeral 210 in FIG. 6) for issuing processing commands according to a predetermined order, and the compression control means (reference numeral 120 in FIG. 1, reference numeral 220 in FIG. 6) for interpreting the issued processing command and controlling the compression processing device. According to the present invention, a compression application may be designed so that it does not directly control the compression processing, and a compression system for compressing video and audio data can be readily constructed by merely forming an application for issuing processing commands in a predetermined order.

These and other object, features and advantages of the present invention will become more apparent in light of the following detailed description of the best mode embodiment thereof, as illustrated in the accompanying drawings.

BRIEF DESCRIPTION OF THE DRAWINGS

FIG. 12 is a sequence diagram showing the processing flow of the device of FIG. 11;

FIG. 13A, 13B and 13C are diagrams showing the structure of video data which are compressed and encoded in conformity with MPEG;

FIG. 15A, 15B and 15C are diagram showing the structure of video and audio data which are compressed and encoded in conformity with MPEG;

FIG. 18 is a detailed block diagram showing system processing means 14 in the device shown in FIG. 11.

DETAILED DESCRIPTION OF THE PREFERRED MODES OF EMBODIMENT

Preferred modes according to the present invention will be described in detail with reference to the accompanying drawings.

First Mode

Figure 1:
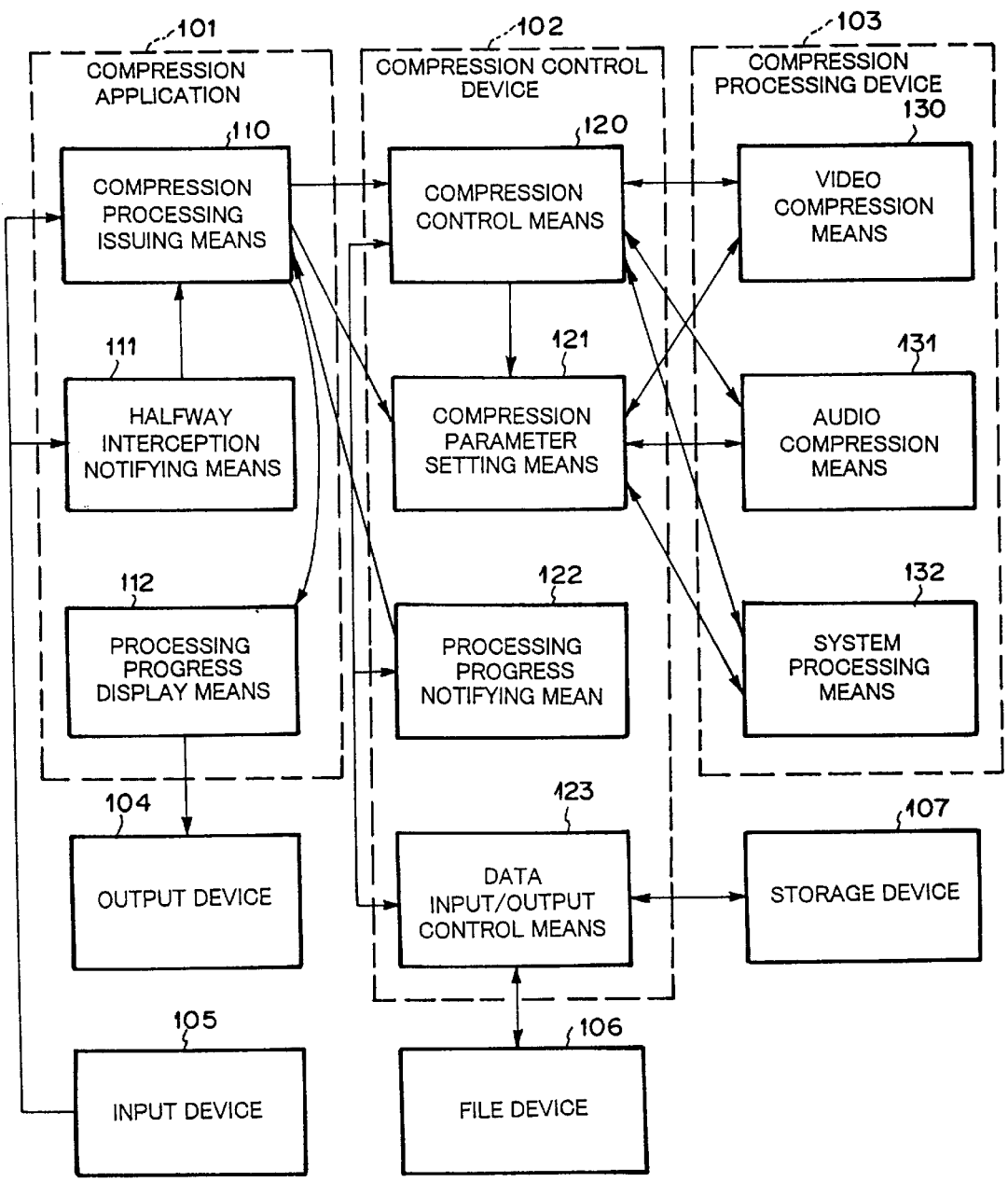
FIG. 1 is a block diagram showing the construction of a first mode of the present invention.

FIG. 1 is a diagram showing the construction of a first mode of a video and audio data compression system of the present invention.

As shown in FIG. 1, the video and audio data compression system according to the first mode includes a compression application 101 which operates under the program control, a compression control device 102 which operates under the program control, a compression processing device 103, an output device 104 such as a display device or the like, an input device 105 such as a keyboard, a mouse or the like, a file device 106 for storing information therein, and a storage device 107 for temporarily storing information.

The compression application 101 has compression processing issuing means 110, halfway interception notifying means 111 and processing progress display means 112.

The compression processing issuing means 110 receives an operator's compression command from the input device 105 to issue processing commands to the compression control device 102 according to a predetermined order. The halfway interception notifying means 111 issues the compression end command to the compression processing issuing means 110 when it receives an operator's compression cease command from the input device 105.

When the processing progress display means 112 receives the progress degree of the compression processing from processing progress notifying means 122 in the progress of the compression processing, the processing progress display means 112 outputs the progress degree to the output device 104.

The compression control device 102 includes compression control means 120, compression parameter setting means 121, processing progress notifying means 122 and data input/output control means 123. Upon receiving the processing command from the compression processing issuing means 110, the compression control means 120 receives video and audio data to be compressed from the data input/output control means 123, and controls the compression processing device 103 to compress the video and audio data. After the compression processing, it outputs the video and audio data to the data input/output control means 123.

The compression parameter setting means 121 receives the parameter setting command from the compression processing issuing means 110 to set various kinds of compression parameters to the compression processing device 103.

The processing progress notifying means 122 transmits to the processing progress display means 112 the progress degree of the compression processing which is calculated by the compression control means 120.

The data input/output control means 123 reads out video and audio data to be compressed from the file device 106 or the storage device 107 and transmits the data to the compression control means 120, and stores into the file device 106 or the storage device 107 the compressed video and audio data transmitted from the compression control means 120.

The compression processing device 103 has video compression means 130, audio compression means 131 and system processing means 132.

The video compression means 130 receives the video data from the compression control means 120 to compress the video data, and then returns the compressed video data to the compression control means 120.

The audio compression means 131 receives the audio data from the compression control means 120 to compress the audio data, and then returns the compressed audio data to the compression control means 120.

The system processing means 132 receives the compressed video and audio data from the compression control means 120 to generate system data for synchronous reproduction, and then returns the system data to the compression control means 120.

Figure 2:
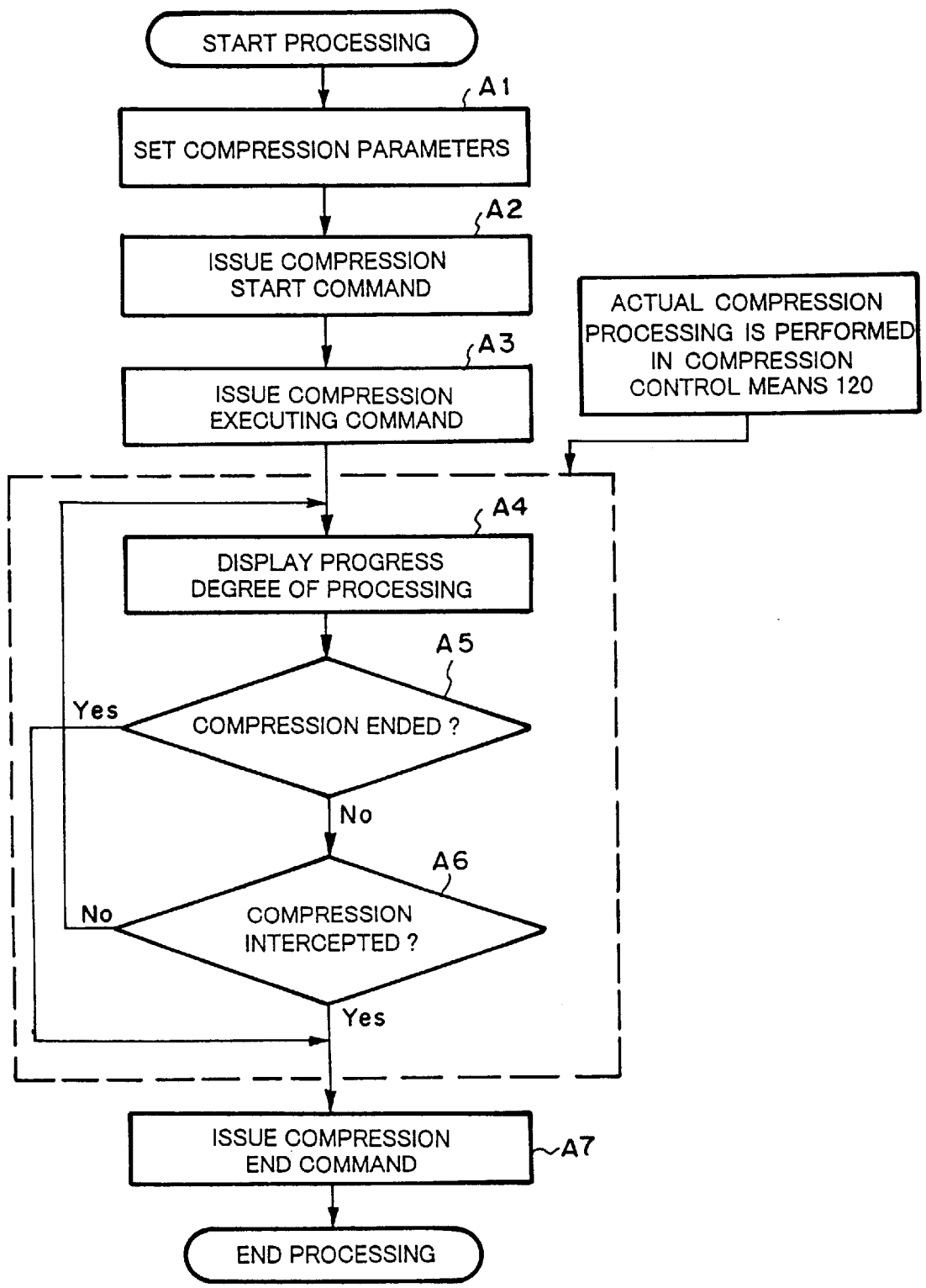
FIG. 2 is a flowchart showing the operation of a compression application 101 in the first mode of the present invention.
Figure 3:
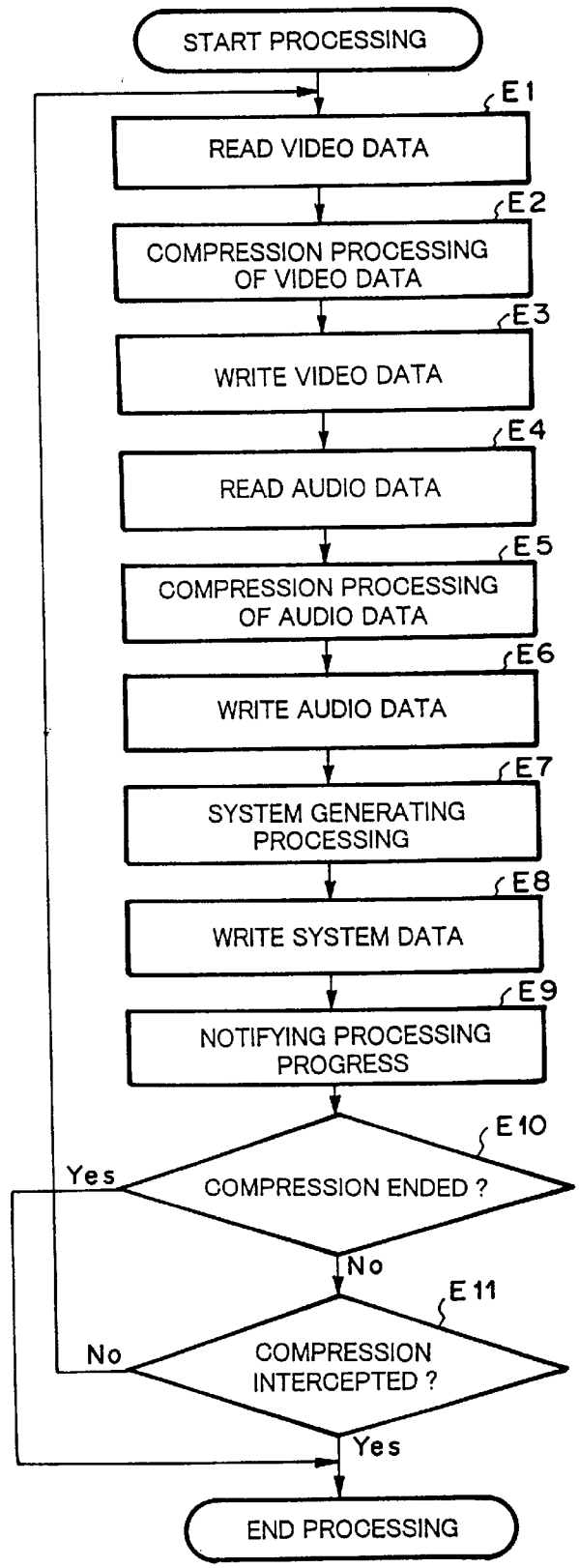
FIG. 3 is a flowchart showing the operation of compression control means 120 in the first mode of the present invention.

FIG. 2 is a flowchart showing the operation of the compression application 101 shown in FIG. 1, and FIG. 3 is a flowchart showing the processing flow of the compression processing in FIG. 2.

The compression processing issuing means 110 issues the processing command to the compression control device 102 in accordance with the predetermined order.

First, the compression processing issuing means 110 sets the compression parameters for the video and audio data to be compressed by issuing the parameter setting command to the compression parameter setting means 121 (step A1). For example, a bit rate used for control of code amount, a frame structure(the structure of GOP) which is a processing unit of the video compression, etc. are set as the parameters. The compression parameter setting means 121 issues the compression parameter setting command to the video compression means 130, the audio compression means 131 and the system processing means 132.

Next, the compression processing issuing means 110 issues the compression start command to the compression control means 120 (step A2). In this mode, upon receiving the compression start command, the compression control means 120 judges whether the compression parameters have been already set to enable the processing to be executed even when the setting of the compression parameters has been omitted. If no parameter has been set, the compression control means 120 lets the compression parameter setting means 121 set the compression parameters to default values. Since knowledge of the video compression is needed to set proper parameters, suitable parameters which are widely used are set as the default values. Further, the compression control means 120 calculates the data amount of audio data whose data amount corresponds to the reproduction time of one frame of the video data to be compressed.

The actual compression processing is started by the issuance of the compression executing command from the compression processing issuing means 110 to the compression control means 120 (step A3).

The compression processing issuing means 110 receives the processing progress degree from the processing progress notifying means 122, and outputs the processing progress degree to the output device 104 through the processing progress display means 112 (step A4).

At this time, the compression processing issuing means 110 judges whether the compression processing is finished (step A5). If the compression processing is finished, it issues the compression end command to the compression control means 120 (step A7). On the other hand, if the compression processing is not finished, the compression processing issuing means 110 judge whether the interception of the compression processing is required. If the interception is not required, the processing returns to the step A4 to continue the compression processing. If the interception is required, it issues the compression end command to the compression control means 120 (step A7).

Upon receiving the compression executing command, the compression control means 120 starts the compression processing which is shown as a flowchart in FIG. 3.

Referring to FIGS. 1 and 3, the compression control means 120 reads the video data in the reproduction order on a frame basis from the file device 106 or the storage device 107 through the data input/output control means 123 (step El), and transmits the read-in video data to the video compression means 130 (step E2).

The video compression means 130 determines the processing order of the video data thus transmitted on the basis of structure of GOP which is set in the step A1 or step A2.

In the case of GOP which is typically shown in FIG. 13C, the frame reproducing order is set to I1, B2, B3, P4, B5, B6, P7, . . . (I, P, B represents picture type, and the numeral subsequent thereto represents the reproduction order).

In order to compress a B picture, I pictures or P pictures just before and just after the B picture are needed to be previously compressed. Therefore, the video compression means 130 rearranges the compressing order of the video data like I1, P4, B2, B3, P7, B5, B6.

The video data are Transmitted in the reproducing order, and thus if there is any B picture which cannot be compressed in this stage, the video data are merely stored into the buffer, and then the video data thus stored are collectively subjected to the video compression processing when a next I picture or P picture is transmitted.

The compression control means 120 stores the video data compressed by the video compression means 130 into the file device 6 or the storage device 7 through the data input/output control means 123 (step E3).

Subsequently, the compression control means 120 reads audio data from the file device 106 or the storage device 107 through the data input/output control means 123 (step E4), and transmits the read-in audio data to the audio compression means 131 to compress the audio data (step E5).

In order to readily generate the system data for allowing the synchronous reproduction of the compressed video and audio data, the audio data amount to be read is made equal to the compressed video data in reproduction time. The audio data amount is calculated on the basis of the data amount of the audio data whose reproducing time is equal to that of one frame of the video data to be compressed which is determined by the compression control means 120 at the time when the compression start command is issued. In this case, the compressing order of the video and audio data is set so that the video data are compressed prior to the audio data. However, the audio data may be first compressed.

The compression control means 120 stores the audio data compressed by the audio compression means 131 into the file device 106 or the storage device 107 through the data input/output control means 123 (step E6).

Subsequently, the compression control means 120 controls the system processing means 132 to generate the system data for achieving the data interleave which guarantees the synchronous reproduction between the video data and the audio data (step E7), and stores the system data into the file device 106 or the storage device 107 through the data input/output control means 123 (step E8).

The compression control means 120 calculates the processing progress degree at the present time in terms of percentage, and notifies it to the processing progress display means 112 through the processing progress notifying means 122 and compression processing issuing means 110(step E9).

The compression control means 120 judges whether the compression processing of all the video and audio data is finished (step E10). If the compression processing is finished, the compression control means finishes the compression processing. If not so, the compression control means 120 judges whether the compression end command is issued from the compression processing issuing means 110. If it is issued, the compression control means 120 finishes the compression processing. If not so, the processing returns to the step E1 to repeat the compression processing (step E11).

The compression control means 120 controls the video compression means 130, the audio compression means 131 and the system processing means 132 to perform the processing of finishing the compression processing.

When uncompressed video data remain (B picture for which the processing is suspended in the step E2), the video compression means 130 compresses the frame transmitted finally in the reproducing order as I picture or P picture irrespective of the picture type in GOP which is set to the frame, and the residual B pictures are collectively compressed by using the compressed I picture or P picture, thereby generating the reproducible video data.

Next, the operation and effect of this mode according to the present invention will be described.

According to the first mode of the present invention, the control processing of the compression processing device 103 and the input/output processing of the data are concentrated in the compression control device 102, and the compression application 101 need not directly control the compression processing.

Figure 4:
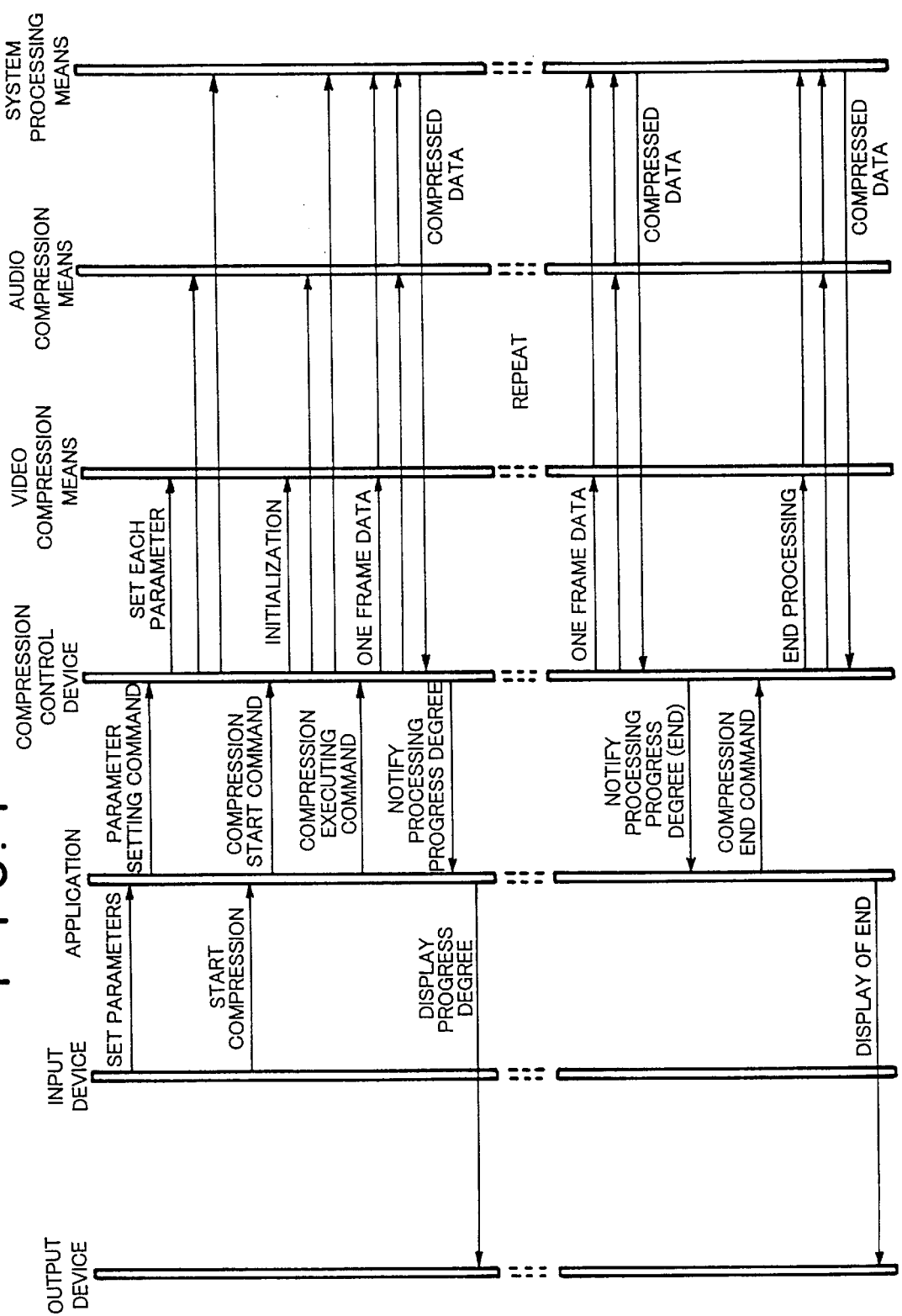
FIG. 4 is a sequence diagram showing the processing flow of the first mode according to the present invention.

Thereafter, as shown in FIG. 4, the compression application 101 can collectively compress both the video data and the audio data by merely issuing the processing command to the compression control device 102 in a predetermined order. That is, it is sufficient for the compression application 101 to issue the parameter setting command, the compression start command, the compression executing command, the compression end command, etc. to the compression control device 102 in the predetermined order.

Figure 11:
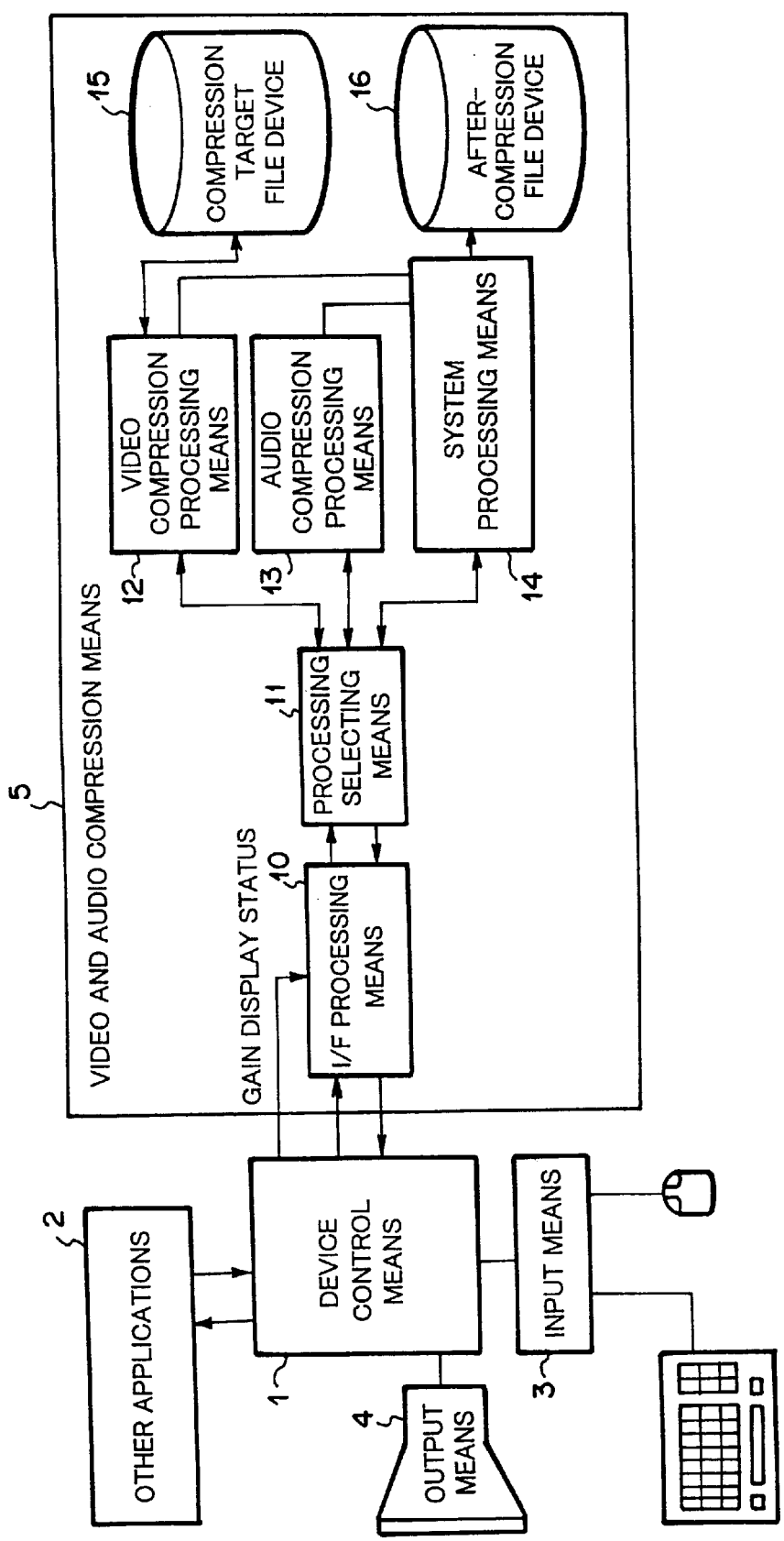
FIG. 11 is a block diagram showing the construction of a video and audio data compression device which is disclosed in Japanese Patent Application No Hei-7-185596 which was not published at the time when the present invention was filed in the Japanese Patent Office.
Figure 14A:
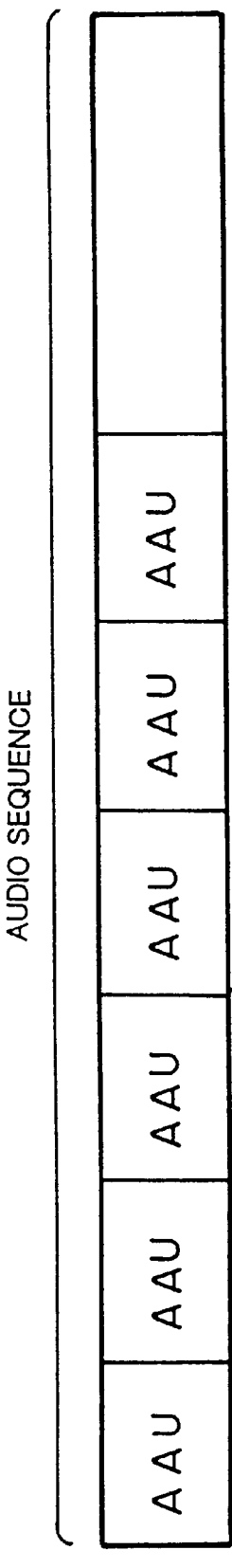
FIG. 14A and 14B are diagrams showing the structure of audio data which are compressed and encoded in conformity with MPEG.
Figure 14B:
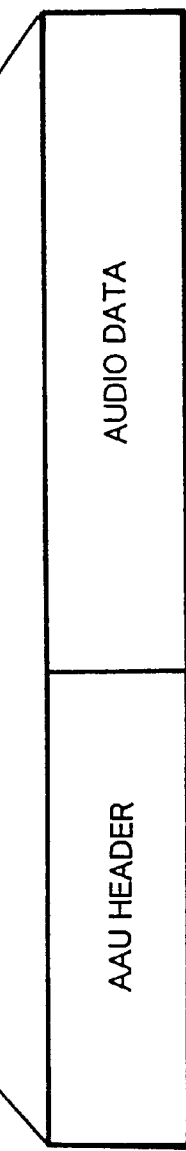
Figure 16:
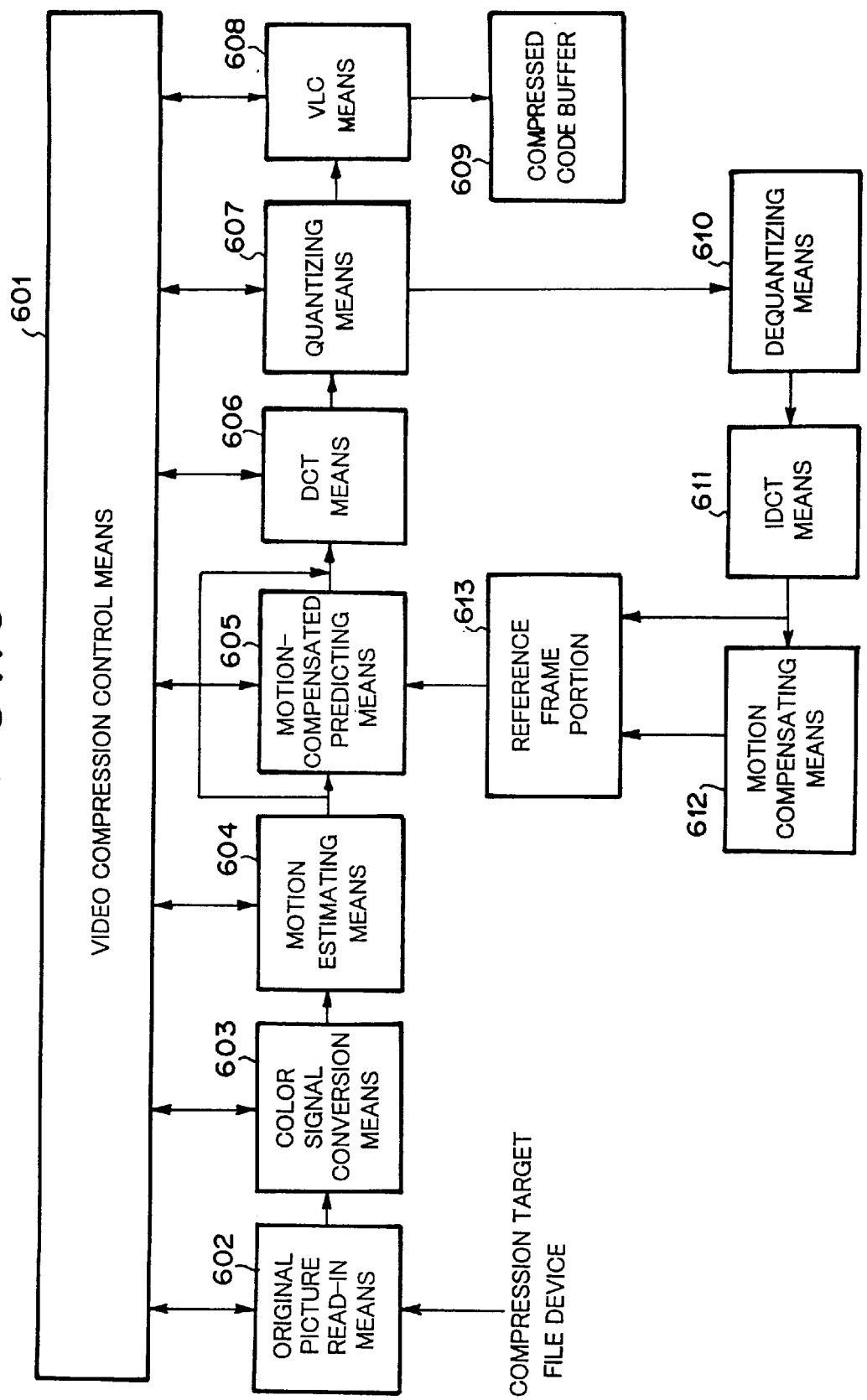
FIG. 16 is a detailed block diagram showing the video compression processing means 12 in the device shown in FIG. 11.
Figure 17:
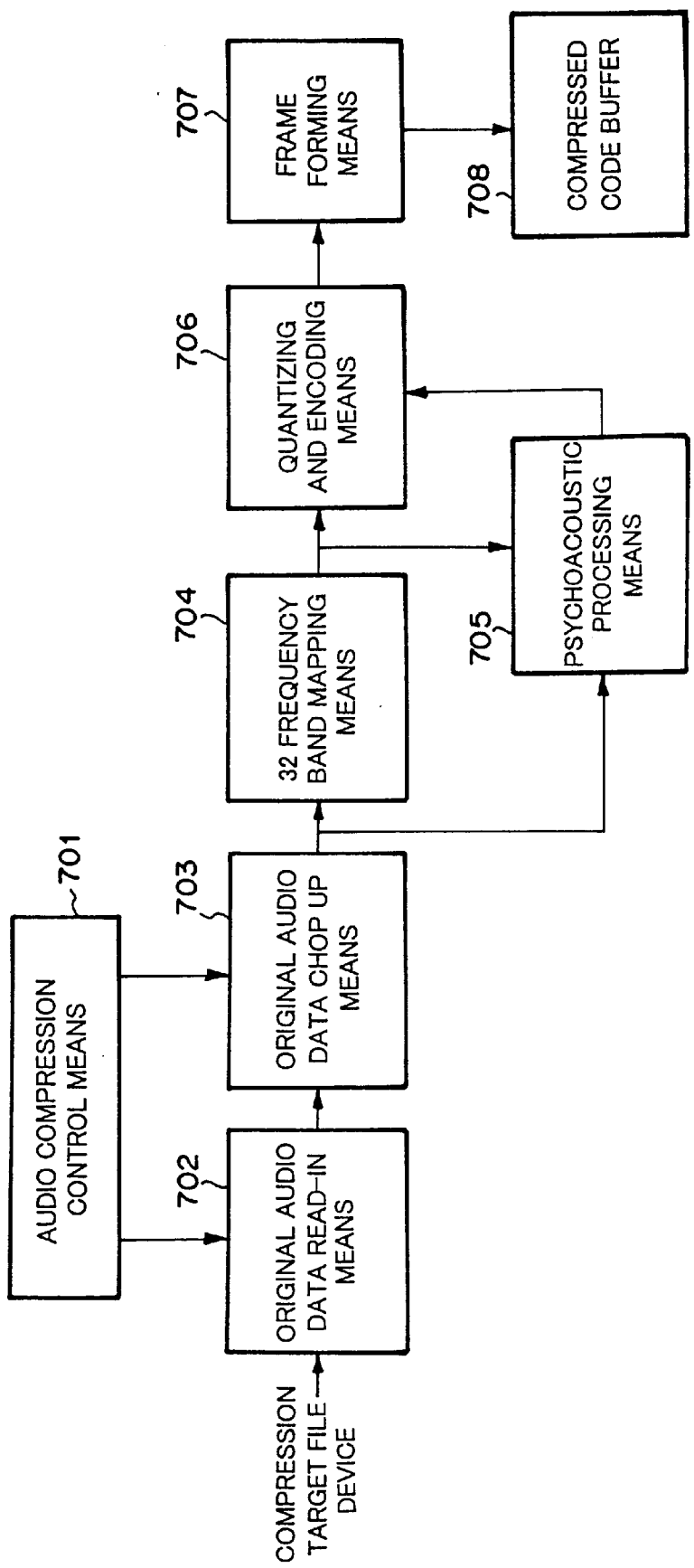
FIG. 17 is a detailed block diagram showing the audio compression processing means 13 in the device shown in FIG. 11.

Further, as compared with the device whose processing procedure is shown in FIG. 12 (the related art shown in FIG. 11), the compression system for compressing the video and audio data can be more easily constructed even without any knowledge of the video and audio data compression.

Second Mode

Next, a second mode according to the present invention will be described in detail with reference to the accompanying drawings.

Figure 6:
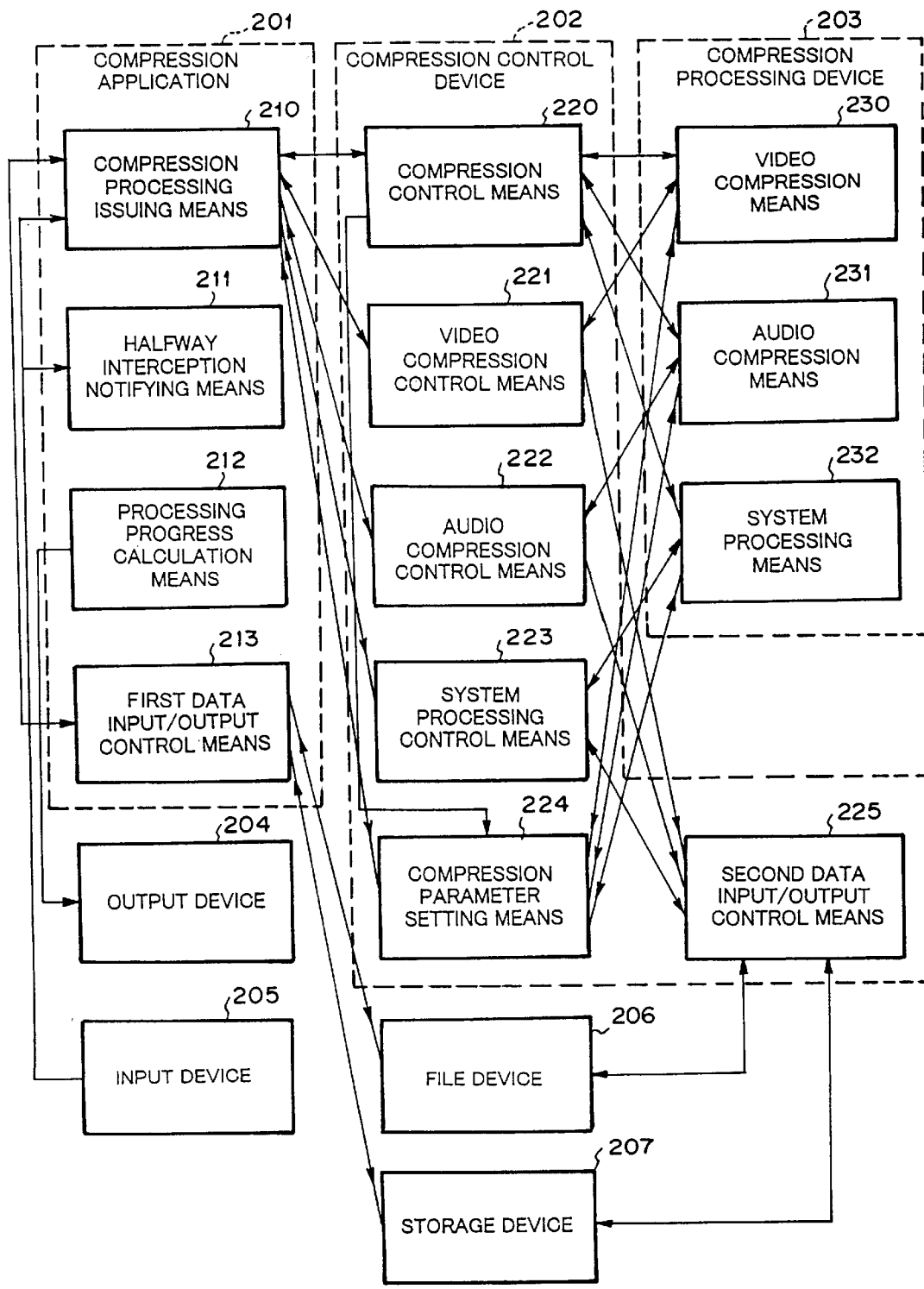
FIG. 6 is a block diagram showing the construction of a second mode according to the present invention.

FIG. 6 is a diagram showing the construction of the second mode of the present invention. As shown in FIG. 6, the video and audio data compression system of the second mode includes a compression application 201 which operates under the program control, a compression processing control device 202 which operates under the program control, a compression processing device 203, an output device 204 such as a display device or the like, an input device 205 such as a keyboard, a mouse or the like, a file device 206 for storing information, and a storage device for temporarily storing information.

The compression application 201 includes compression processing issuing means 210, halfway interception notifying means 211, processing progress calculation means 212, and first data input/output control means 213.

The compression processing issuing means 210 receives an operator's compression command from the input device 205, and issues the processing command to the compression control device 202 according to a predetermined order.

The halfway interception notifying means 211 issues a compression end command to the compression processing issuing means 210 when it receives an operator's compression cease command from the input device 205 in the progress of the compression processing.

The processing progress calculation means 212 calculates the progress degree of the processing on the basis of the number of frames being presently compressed in the progress of the compression processing, and outputs the progress degree thus calculated to the output device 204.

The first data input/output control means 213 reads out video and audio data to be compressed from a file device 206 or a storage device 207, and transmits the data to the compression processing issuing means 210. Further, it stores into the file device 206 or the storage device 207 the compressed video and audio data which are transmitted from the compression processing issuing means 210.

The compression control device 202 includes compression control means 220, video compression control means 221, audio compression control means 222, system processing control means 223, compression parameter setting means 224 and second data input/output control means 225.

The compression control means 220 receives the processing command from the compression processing issuing means 210, and performs initialization processing and the ending processing of the compression processing to the compression processing device 203.

The video compression control means 221 receives the video data from the compression processing issuing means 210, and controls the video compression means 230 to compress the video data and stores the compressed video data in the file device 206 or storage device 207 through the second input/output control means 225.

The audio compression control means 222 receives the audio data from the compression processing issuing means 210, and controls the audio compression means 231 to compress the audio data and stores the compressed audio data in the file device 206 or storage device 207 through the second input/output control means 225.

The system processing control means 223 receives the compressed video and audio data from the compression processing issuing means 210 and controls the system processing means 232 to generate the system data for synchronous reproduction and stores the system data in the file device 206 or storage device 207 through the second input/output control means 225.

The compression parameter setting means 224 receives the parameter setting command from the compression processing issuing means 210 to set various compression parameters to the compression processing device 203.

The compression processing device 203 includes video compression means 230, audio compression means 231 and system processing means 232.

The video compression means 230 receives the video data from the video compression control means 221 to compress the video data, and then returns the compressed video data to the video compression control means 211.

The audio compression means 231 receives the audio data from the audio compression control means 222 to compress the audio data, and then returns the compressed audio data to the audio compression control means 222.

The system processing means 232 receives the compressed video and audio data from the system processing control means 223 to generate the system data for synchronous reproduction, and then returns the system data to the system processing control means 223.

Figure 7:
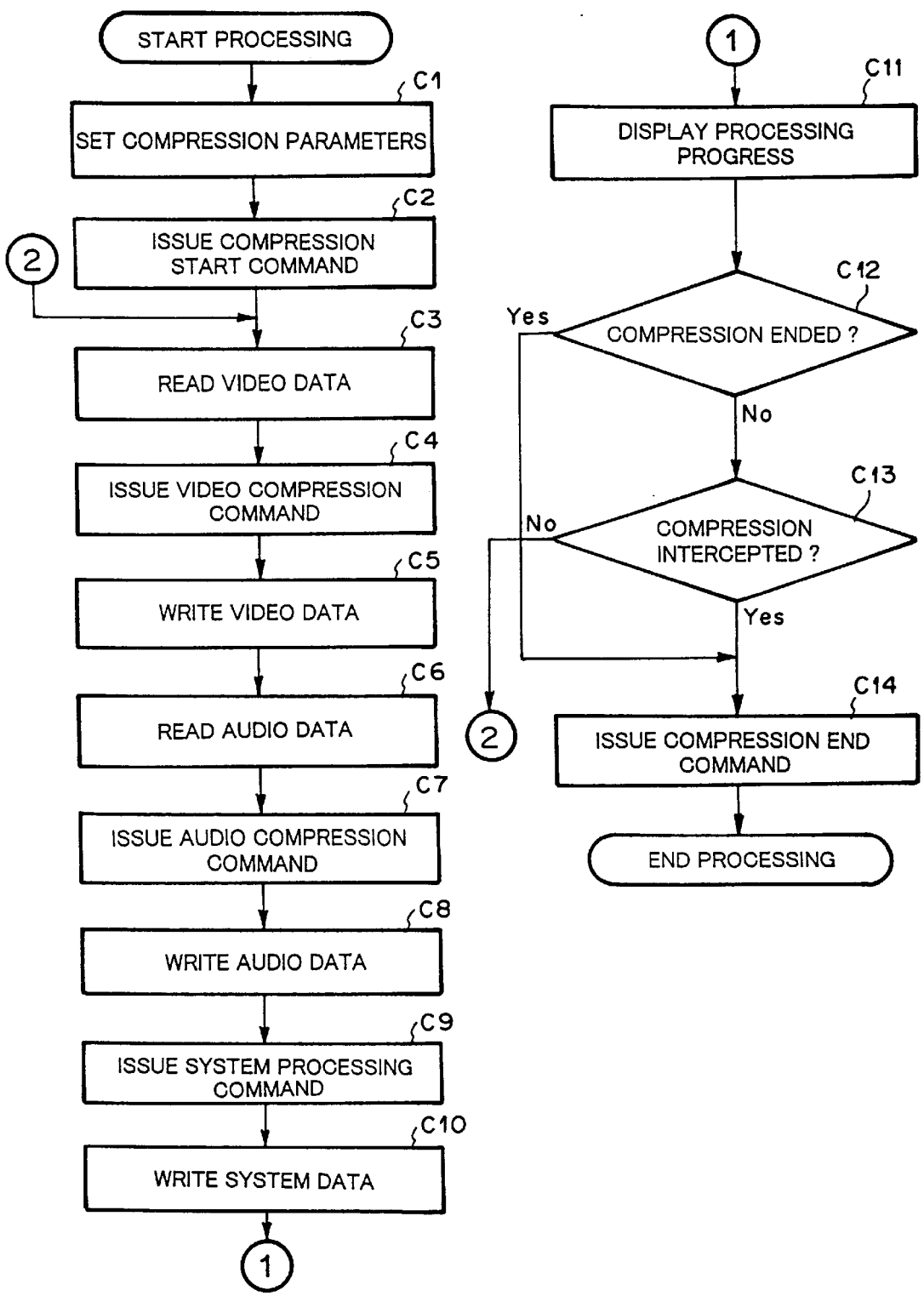
FIG. 7 is a flowchart showing the operation of a compression application 101 in the second mode of the present invention.

FIG. 7 is a flowchart showing the operation of the compression application 201 in the second mode of the present invention.

The compression processing issuing means 210 issues the processing command to the compression control device 202 in a predetermined order. That is, as shown in FIG. 7, the compression processing issuing means 210 issues a parameter setting command to the compression parameter setting means 224 to set the compression parameters for the video and audio data to be compressed (step C1), and subsequently it issues a compression start command to the compression processing control means 220 (step C2).

Upon receiving the compression start command, the compression control means 220 judges whether the compression parameters have been already set. If the parameters have not yet been set, it controls the compression parameter setting means 224 to set the compression parameters to the default values.

Further, the compression control means 220 calculates the data amount of the audio data whose data amount corresponds to the reproduction time of one frame of the video data to be compressed. The compression parameter setting means 224 sets the compression parameters to the video compression means 230, the audio compression means 231 and the system processing means 232.

Next, the compression processing issuing means 210 reads the video data through the first data input/output control means 213 from the file device 206 or the storage device 207 (step C3), transmits the read video data to the video compression control means 221, and issues the video compression command (step C4).

Upon receiving the video compression command, the video compression control means 221 controls the video compression means 230 to compress the video data. The video compression means 230 determines the processing order of the video data thus transmitted on the basis of the structure of GOP which is set in the step C1 or step C2.

For example, in the case of such GOP as shown in FIG. 13, the order of frames to be reproduced is set to I1, B2, B3, P4, B5, B6, P7, ... (I, P, B represents the picture type, and the subsequent numeral represents the order). In order to compress a B picture, I pictures or P pictures just before and just after the B picture are required to be compressed in advance, and thus the video compression means 230 rearranges the compressing order of the video data in the order to I1, P4, B2, B3, P7, B5, B6.

The video data are transmitted in the reproduction order. Therefore, when there is a B picture which cannot be compressed at this stage, the video data are merely stored into the buffer at this stage, and then the data will be collectively subjected to the video compression processing when a next I picture or P picture is transmitted.

The video compression control means 221 stores the video data compressed by the video compression means 230 through the second data input/output means 225 into the file device 6 or the storage device 7 (step C5).

Next, the compression processing issuing means 210 reads the audio data from the file device 206 or the storage device 207 through the first data input/output control means 213 (step C6), then transmits the read audio data to the audio compression control means 222, and issues the audio compression command. At this time, in order to facilitate the generation of the system data for performing the synchronous reproduction of the compressed video and audio data, the data amount of the audio data which are read at this time is made equal in reproduction time to the video data which have been just before compressed.

The audio data amount is calculated from the data amount of the audio data whose data amount corresponds to the reproduction time of one frame of video data to be compressed which is calculated by the compression control means 220 when the compression start command is received, and delivers the calculation result to the compression processing issuing means 210.

Further, in this case, the compressing order is set so that the video data is compressed prior to the audio data. However, the audio data may be compressed before the compression of the video data.

Upon receiving the audio compression command, the audio compression control means 222 controls the audio compression means 231 to compress the audio data (step C7).

The audio compression control means 222 stores the audio data compressed by the audio compression means 231 into the file device 206 or the storage device 207 through the second data input/output means 225 (step C8).

Subsequently, the compression processing issuing means 210 issues a system generating command to the system control means 223 (step C9). Upon receiving the system generating command, the system control means 223 controls the system processing means 232 to generate the system data which realizes the data interleave for guaranteeing the synchronous reproduction of the video and audio data.

The system control means 223 stores the system data thus generated into the file device 206 or the storage device 207 through the second data input/output control means 225 (step C10).

The processing progress calculating means 212 calculates the processing progress degree at the present time in terms of percentage, for example, and then outputs the calculation result to the output device 204 (step C11).

The compression processing issuing means 210 judges whether the compression processing of all the video data and the audio data is finished (step C12). If the compression processing has been finished, the compression processing issuing means 210 issues the compression end command to the compression control means 220, and ends the compression processing (step C14).

On the other hand, when the compression processing has not yet been finished in step C12, it is judged whether the halfway interception command is input from the input device 205 to the halfway interception notifying means 211 (step C13). If the halfway interception command has been input, the compression end command is issued to the compression control means 220, and the compression processing is finished (step C14). If not so, the processing returns to the step C3 to repeat the compression processing.

Upon receiving the compression end command, the compression control means 220 controls the video compression means 230, the audio compression means 231 and the system processing means 232 to finish the compression processing.

When uncompressed video data (B picture for which the processing in step C4 is suspended) remain, the video compression means 230 compresses the frame transmitted finally in the reproduction order as I picture or P picture irrespective of the picture type in GOP which is set to the frame, and the residual B pictures are collectively compressed by using the compressed I picture or P picture to generate reproducible video data.

Next, the operation and the effect of the second mode according to the present invention will be described.

(1) The effect of this mode according to the present invention resides in that the compression system for compressing video and audio data can be more easily constructed even without any knowledge of the video and audio data compression as compared with the prior art.

Figure 9:
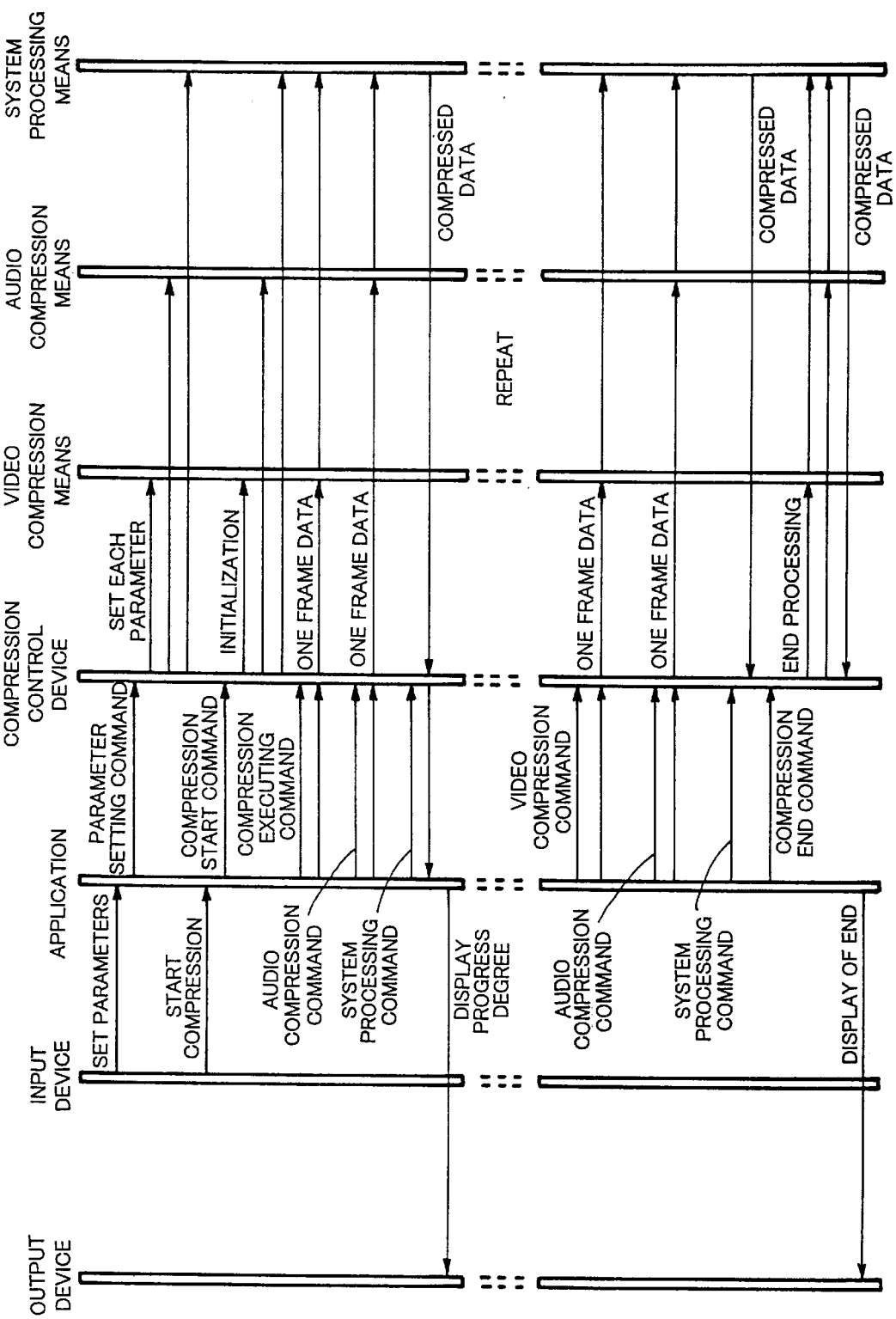
FIG. 9 is a diagram showing the processing flow of the second mode of the present invention.

In the second mode according to the present invention, the control processing of the compression processing device 203 is concentrated to the compression control device 202, and thus the compression application 201 is not required to directly control the compression processing. Thereafter, as shown in FIG. 9, the compression application 201 merely issues the processing commands to the compression control device 202 in the predetermined order, whereby the video and audio data compression can be collectively compressed. That is, it is sufficient for the compression application to merely issue the parameter setting command, the compression start command, the video compression command, the audio compression command, the system processing command and the compression end command to the compression control device in the predetermined order.

(2) The second effect of the second mode according to the present invention resides in that the video and audio data before and after the compression can be input/output from a device which is different from the file device. This is because the compression application 201 is provided with a compression mode (buffer return mode) in which the video and audio data can be directly processed.

Next, the above-described preferred modes of the present invention will be described in more detail on the basis of preferred embodiments, and the operation of the preferred embodiments will be also described in detail.

Embodiment 1

Figure 5:
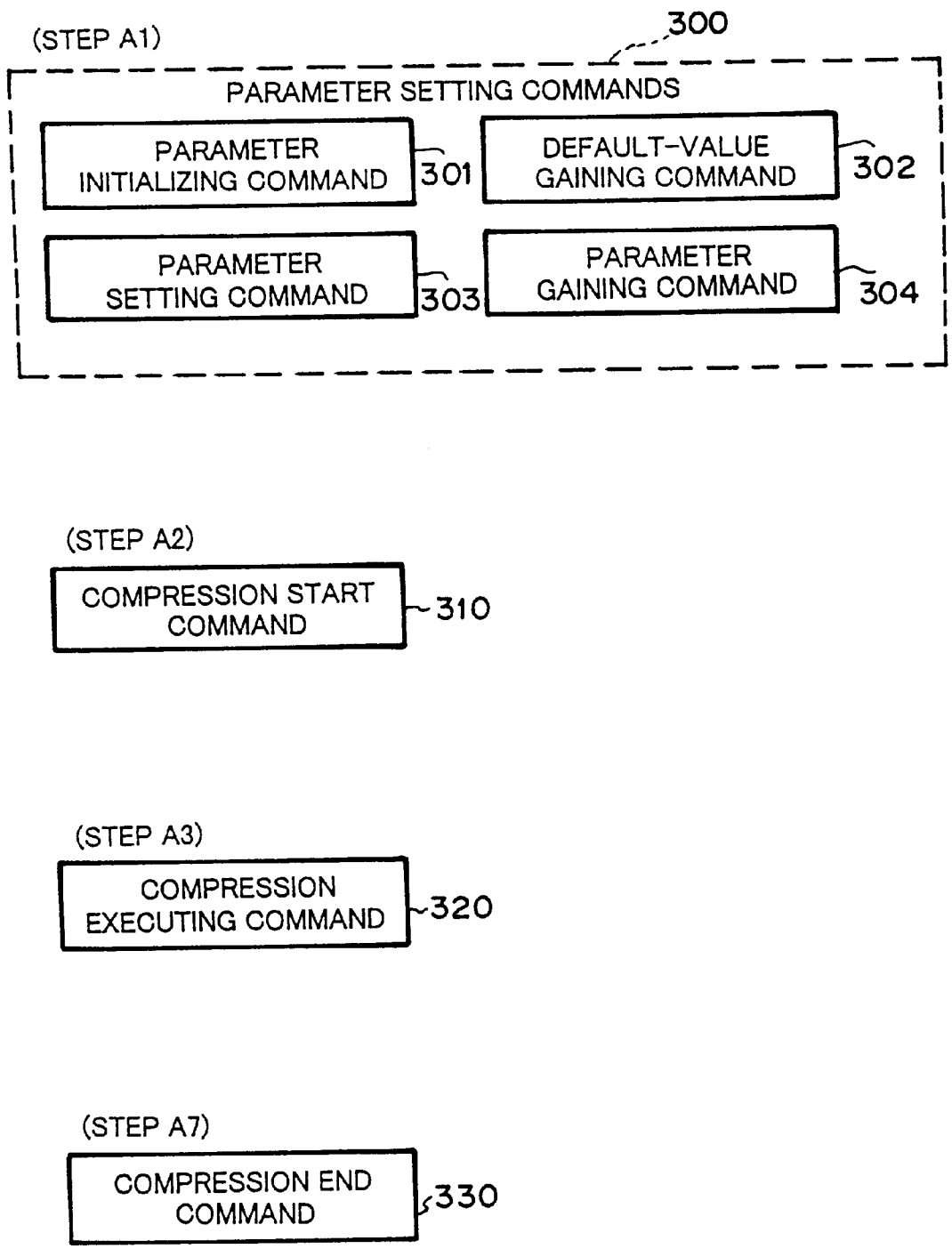
FIG. 5 is a diagram showing a processing command which is issued by compression processing issuing means 110 in the first mode of the present invention.

FIG. 5 is a diagram showing a list of processing commands which are issued by the compression processing issuing means of the first embodiment corresponding to the first mode of the present invention. In FIG. 5, steps A1, A2, A3, A7 correspond to the respective steps of the flowchart shown in FIG. 2.

The compression processing issuing means 110 first issues a parameter setting command 300 to the compression parameter setting means 121 (step A1). There are the following four types of the parameter setting commands.

(1) Upon receiving a parameter initializing command 301, the compression parameter setting means 121 sets the compression parameters to suitable default values which are often used.

(2) Upon receiving a default-value gaining command 302, the compression parameter setting means 121 transmits to the compression processing issuing means 110 the compression parameters of the proper default values which are often used.

(3) Upon receiving a parameter setting command 303, the compression parameter setting means 121 sets the compression parameters to the compression parameters which are transmitted from the compression processing issuing means 110.

(4) Upon receiving a parameter gaining command 304, the compression parameter setting means 121 transmits the currently set compression parameters to the compression processing issuing means 110.

The compression processing issuing means 110 sets the compression parameters by suitably selecting one of the above four types of commands.

If the compression processing issuing means 110 has never issued the compression parameter setting command 300, the compression control means 120 issues the parameter initializing command 301 to the compression parameter setting means 121.

The compression processing issuing means 110 issues the compression start command 310 to the compression control means 120 when the setting of the compression parameter is finished (step A2). The compression processing issuing means 110 indicates the name of a file to be compressed at this time and the name of the compressed file.

Subsequently, the compression processing issuing means 110 issues the compression executing command 320 to the compression control means 120 (step A3). Receiving the compression executing command, the compression control means 120 starts the compression processing.

When the compression processing is finished on schedule or intercepted in response to a user's request, the compression processing issuing means 110 issues the compression end command 330 to the compression control means 120 (step A7).

Embodiment 2

Figure 10:
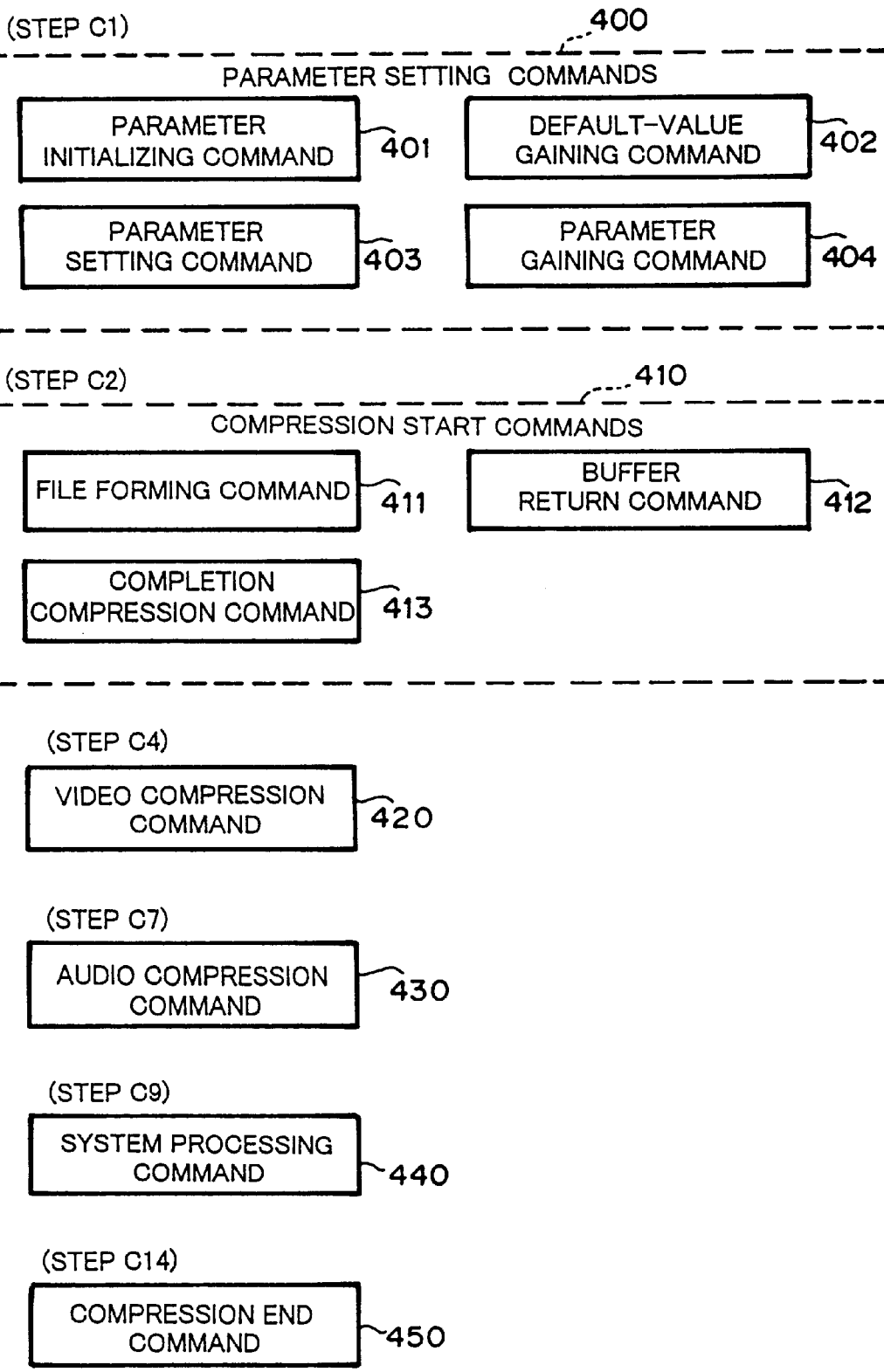
FIG. 10 is a diagram showing the processing command which is issued by compression processing issuing means 210 in the second mode of the present invention.

FIG. 10 is a diagram showing a list of processing commands which are issued by the compression processing issuing means 210 of the second embodiment corresponding to the second mode of the present invention. In FIG. 10, the step C1, C2, C3, C7 corresponds to each step of the flowchart shown in FIG. 7.

The compression processing issuing means 210 first issues the parameter setting command 400 to the compression parameter setting means 224 (step C1). There are the following four types of the parameter setting commands 400.

(1) Upon receiving a parameter initializing command 401, the compression parameter setting means 224 sets the compression parameters to proper default values which are often used.

(2) Upon receiving a parameter gaining command 402 of the default values, the compression parameter setting means 224 transmits to the compression processing issuing means 210 the compression parameters of the proper default values which are often used.

(3) Upon receiving a parameter setting command 408, the compression parameter setting means 224 sets the compression parameters to the compression parameters which are transmitted from the compression processing issuing means 210.

(4) Upon receiving a parameter gain command 404, the compression parameter setting means 224 transmits the currently set compression parameters to the compression processing issuing means 210.

The compression processing issuing means 210 sets the compression parameters by suitably selecting one of the above four kinds of commands. When the compression processing issuing means 210 has never issued the compression parameter setting command 400, the compression control means 220 issues the parameter initializing command 401 to the compression parameter setting means 224 in the subsequent step C2.

When the setting of the compression parameters is finished, the compression processing issuing means 210 issues the compression start command 410 to the compression control means 220 (step C2). At this time, the compression processing issuing means 210 selects any one of the following three kinds of commands.

The three kinds of the compression start commands are a file forming command 411, a buffer return command 412 and a complete compression command 418.

First, the operation when the file forming command 411 or the buffer return command 412 are issued will be described with reference to FIG. 7.

According to the file forming command 411, the compression control device 202 stores the compressed data into the file device 206.

According to the buffer return command 412, the compression control device 202 stores the compressed data into the storage device 207. The subsequent data processing of the compressed data such as the storage of the compressed data into the storage device 207, etc. are performed by the compression processing issuing means 210. When receiving the compression start command 410, the compression processing control means 220 calculates the data amount of the audio data which corresponds to the reproduction time of one frame of the video data, and transmits this value to the compression processing issuing means 210.

Subsequently, the compression processing issuing means 210 performs the compression processing described later after the compression start command 410 is issued (steps C3 to C13).

The compression processing issuing means 210 reads the video data of one frame from the file device 206 or the storage device 207 through the first data input/output control means 213 (step C3).

Subsequently, the compression processing means 210 transmits the read-in video data to the video compression control means 221 and issues the video compression command 420 (step C4).

The video compression control means 221 controls the video compression means 230 to compress the video data. The video compression means 230 rearranges the order of the frames to be compressed as described in the second mode.

When the compression method corresponds to the file forming command 411, the video compression control means 221 stores the compressed image data through the second data input/output control means 225 into the file device 206. When the compression method corresponds to the buffer return command 412, the video compression control means 221 stores the compressed video data through the second data input/output control means 225 into the storage device 207, and then the compression processing issuing means 210 performs the processing of reading out the compressed video data in the storage device 207 through the first data input output control means 213, and storing the data into the file device 206 (step C5). In place of storing the compressed data into the file device 206, the compressed data may be transmitted to a network.

Subsequently, the compression processing issuing means 210 f the audio data having the data amount corresponding to the reproduction time of one frame of the video data from the file device 206 or the storage device 2067 through the first data input/output control means 213. (step C6).

Subsequently, the compression processing issuing means 210 transmits the read-in audio data to the audio compression control means 222 and issues the audio compression command 430 (step C7). The audio compression control means 222 controls the audio compression means 231 to compress the audio data. When the compression method corresponds to the file forming command 411, the audio compression control means 222 stores the compressed audio data into the file device 206 through the data output control means 255. If the compression method corresponds to the buffer return command 412, the audio compression control means 222 stores the audio data into the storage device 207 through the data output control means 255. Thereafter, the compression processing issuing means 210 reads out the compressed video data in the storage device 207 through the first data input/output control means 213 and then stores the read compressed video data into the file device 206 (step C8). In place of storing the data into the file device 206, the data may be transmitted to a network.

Subsequently, the compression processing issuing means 210 issues the system processing command 440 to the system control means 223 (step C9). The system control means 223 controls the system processing means 232 to generate the system data for implementing the data interleave which guarantees the synchronous reproduction of the video data and the audio data.

When the compression method corresponds to the file forming command 411, the system processing control means 223 stores the system data thus generated into the file device 206 through the second data input/output control means 225. When the compression method corresponds to the buffer return command 412, the system processing control means 223 stores the system data thus generated through the second data input/output control means 225 into the storage device 207. Thereafter, the compression processing issuing means 210 reads out the system data in the storage device 207 through the first data input/output control means 213, and stores the data into the file device 206 (step C10). In place of storing the data into the file device 206, the data may be transmitted to a network.

The processing progress calculation means 212 calculates the progress degree of the processing on the basis of the number of frames which are currently processed during the compression processing, and outputs the calculation result to the output device 204 (step C11).

In order to finish or intercept the compression processing, the compression processing issuing means 210 issues the compression end command 450 to the compression control means 220 (steps C12 to 14).

Figure 8:
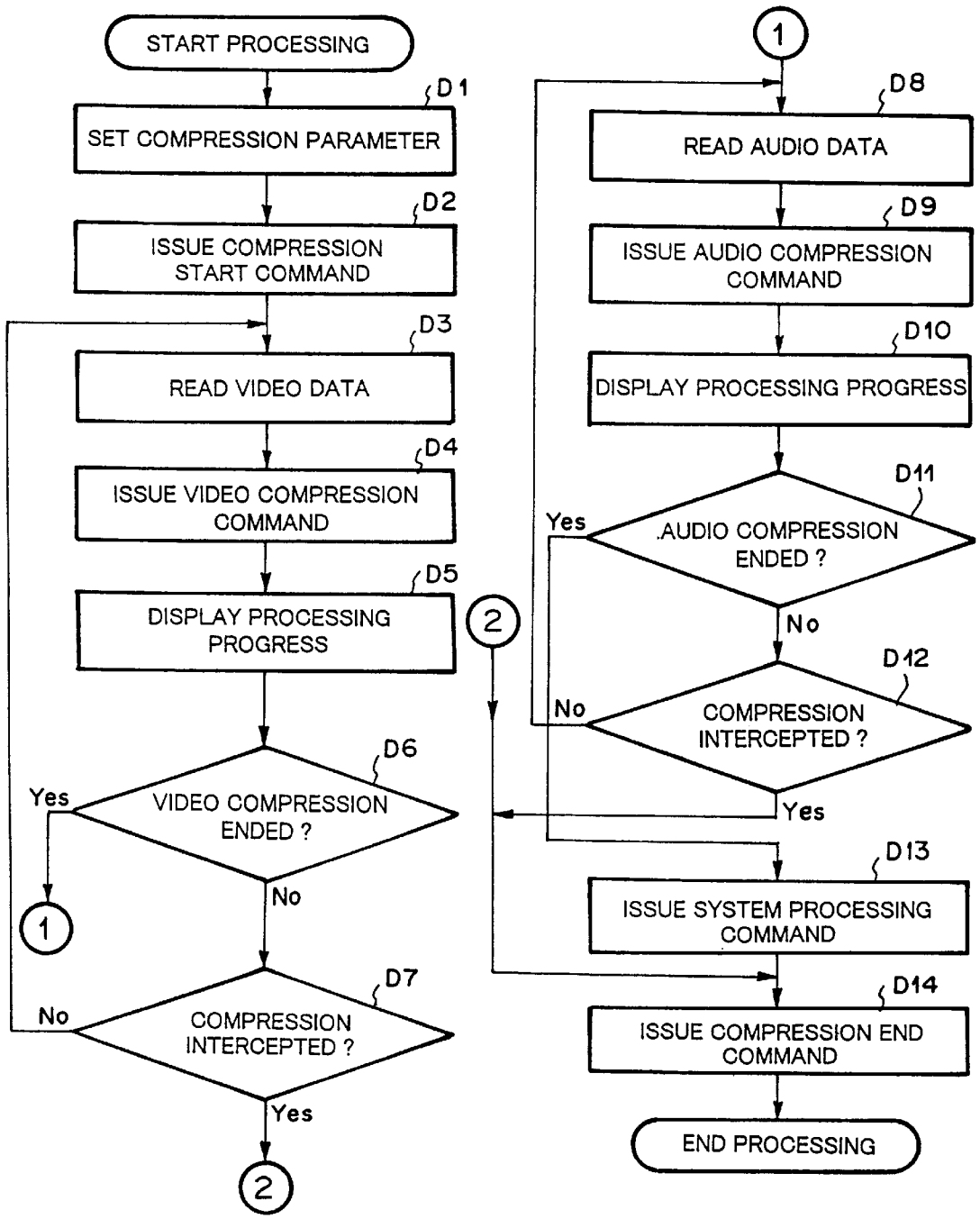
FIG. 8 is a flowchart showing the operation of compression control means 120 in the second mode of the present invention.

Next, the operation when the complete compression command 413(see FIG. 10) is indicated (selected) at the issue time of the compression start command 410 will be described with reference to the flowchart of FIG. 8.

When the compression method corresponds to the complete compression command 413, the compression processing issuing means 210 collectively repeats the processing from step D3 to step D7 show in FIG. 8 as described later until the compression of all the video data is completed, and then the compression processing of the video data is finished.

The compression processing issuing means 210 reads the video data of one frame from the file device 206 or the storage device 207 through the first data input/output control means 213 (step D3).

Subsequently, the compression processing issuing means 210 transmits the read-in video data to the video compression control means 221 and issues the video compression command (step D4). The video compression control means 221 controls the video compression means 280 to compress the video data.

The compressed video data are temporarily stored through the second data input/output control means 225 into the file device 206 or the storage device 207 by the video compression control means 221. Subsequently, the processing progress calculation means 212 calculates the progress degree of the processing on the basis of the number of frames of currently-processed video data under compression processing, and outputs the calculation result to the output device 204 (step D5).

In the case that the compression processing should be finished or intercepted, the compression processing issuing means 210 issues the compression end command 450 to the compression control means 220 (steps D6 to D7).

Subsequently, the compression processing issuing means 210 repeats the processing from the step D8 to the step D12 until the compression of the audio data is finished, and finishes the compression processing of the audio data.

First, the compression processing issuing means 210 reads from the file device 206 or the storage device 207 through the first data input/output control means 213 the audio data whose data amount corresponds to the reproduction time of one frame of the video data (step D8).

The compression processing issuing mans 210 transmits the read-in audio data to the audio compression control means 222 and issues the audio compression command 430 (step D9). The audio compression control means 222 controls the audio compression means 231 to compress the audio data. The compressed audio data are temporarily stored into the file device 206 or the storage device 207 through the second data input/output control means 225 by audio compression control means 222.

Subsequently, the processing progress calculation means 212 calculates the progress degree of the processing on the basis of the number of frames of currently-processed audio data under the compression processing, and then outputs the calculation result to the output device 204 (step D10).

In the case that the compression processing should be finished or intercepted, the compression processing issuing means 210 issues the compression end command 450 to the compression control means 220 (steps D11 to D12).

Finally, the compression processing issuing means 210 issues the system processing command 440 to the system control means 223 (step D13).

The system control means 223 reads the compressed video data and the compressed audio data which are temporarily stored in the file device 206 or the storage device 207, and controls the system processing means 282 to generate the system data for implementing the data interleave which guarantees the synchronous reproduction of the video data and the audio data. The system data thus generated are finally stored into the file device 206 through the second data input/output control means 225.

As mentioned above, the first effect of the present invention is that a compression system for compressing video data and audio data can be easily constructed by merely forming an application which issues processing commands in a predetermined order even without any knowledge of the video and audio data compression processing. This is because the control processing of the compression processing device and the input/output processing of data are concentrated to the compression control device, and the compression application is permitted not to directly control the compression processing.

The second effect of the present invention is that the video and audio data before and after the compression can be input/output to/from a device other than the file device, for example, a network. This is because the present invention is provided with a compression mode in which the compression application can directly handle the video and audio data, specifically the buffer return mode.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A video and audio data compression system which comprises:

compression processing issuing means for issuing compression processing commands in a predetermined order;

a compression processing device for performing the compression processing of moving pictures and sounds (hereinafter referred to as "video and audio data"); and means for interpreting the compression processing commands issued by the compression processing issuing means and controlling said compression processing device.

2. The video and audio data compression system as claimed in claim 1, wherein said means for controlling said compression processing device comprises compression control means for interpreting the compression processing commands issued by said compression processing issuing means and controlling said compression processing device, compression parameter setting means for setting compression parameters of the video and audio data, processing progress notifying means for calculating and notifying the progress degree of the compression processing, and data input/output control means for controlling input/output of the video and audio data.

3. The video and audio data compression system as claimed in claim 2, wherein the compression processing commands contain a compression parameter setting commands for setting the compression parameters of the video and audio data, a compression start command for starting the compression processing of the video and audio data, a compression executing command for executing the compression processing of the video and audio data, and a compression end command for finishing the compression processing of the video and audio data.

4. The video and audio data compression system as claimed in claim 3, wherein the compression parameter setting commands contain a parameter initializing command for setting the compression parameters to proper values which are often used, a default-value gaining command for gaining the compression parameters of proper values which are often used, a parameter setting command for setting the compression parameters, and a parameter gaining command for gaining the setting of the current compression parameters.

5. The video and audio data compression system as claimed in claim 4, wherein when the compression start command is started before the compression parameter setting command is issued, said compression control means controls said compression parameter setting means to set the default parameters.

6. The video and audio data compression system as claimed in claim 1, wherein said means for controlling said compression processing device comprises:

compression control means for interpreting the compression processing commands issued from said compression processing issuing means to control said compression processing device;

video compression control means for controlling the video compression processing;

audio compression control means for controlling the audio compression processing;

system processing control means for controlling processing of generating system data which enables synchronous reproduction of the video and audio data;

compression parameter setting means for setting the compression parameters of the video and audio data; and data input/output control means for controlling input/output of the video and audio data and the system data.

7. The video and audio data compression system as claimed in claim 6, wherein the compression processing commands contain:

compression parameter setting commands for executing the setting of the compression parameters of the video and audio data;

compression start commands for starting the compression processing of the video and audio data;

a video compression command for executing the compression processing of the video and audio data;

an audio compression command for executing the compression processing of the audio data;

a system processing command for generating system data which enables the synchronous reproduction of the video and audio data; and a compression end command for finishing the compression processing of the video and audio data.

8. The video and audio data compression system as claimed in claim 7, wherein the compression parameter setting commands contain:

a parameter initializing command for setting the compression parameters to proper values which are often used;

a default-value gaining command for gaining the compression parameters of values which are often used;

a parameter setting command for setting the compression parameters; and a parameter gaining command for gaining the setting of current compression parameters.

9. The video and audio data compression system as claimed in claim 8, wherein when the compression start command is started before the compression parameter setting command is issued, said compression control means controls said compression parameter setting means to set the compression parameters to defaults values.

10. The video and audio data compression system as claimed in claim 9, wherein said compression start commands contain:

a file forming command for compressing the video data, the audio data and the system data in the unit of frame during the compression processing, and storing the compressed video and audio data into said file device;

a buffer return command for compressing the video data, the audio data and the system data in the unit of frame during the compression processing, and storing the compressed video and audio data into a storage device; and a completion compression command for collectively compressing each of the video data, the audio data and the system data, and storing the compressed video and audio data into a file device.

11. The video and audio data compression system as claimed in claim 8, wherein said compression control means calculates the audio data amount corresponding to the reproduction time of one frame of the video data when receiving the compression start command, and transmits the audio data amount thus calculated to said compression processing issuing means.

12. The video and audio data compression system as claimed in claim 1, wherein said compression processing device comprises video compression means for compressing the video data, audio compression means for compressing the audio data, and system processing means for generating system data which enables the synchronous reproduction of the video and audio data.

13. The video and audio data compression system as claimed in claim 12, wherein said video compression means receives the video data in a reproduction frame order, stores the video data in a storage device until a minimum frame unit which enables compression is collected, and rearranges the frames in a compression-processing order, and performs the compression processing every frame.

14. The video and audio data compression system as claimed in claim 13, wherein said video compression means compresses the final frame in the reproduction order by a compression method which uses no correlation with the subsequent frame, whereby reproducible compressed video data are generated even when the number of all the frames of the video data is not divided by the fixed minimum compressible frame unit.

15. A video and audio data compression system comprising:

a compression application;

a video and audio compression processing device; and a control means for receiving compression processing commands from said compression application and controlling said video and audio compressing device, wherein said video and audio compression processing device comprises:

video compression means for compressing video data;

audio compression means for compressing audio data; and system processing means for generating system data which enables synchronous reproduction of the video and audio data, and wherein said compression application is designed to merely issue to said control means a compression parameter setting command, a compression start command, a compression executing command, and a compression end command without directly controlling the compression processing of said video compression processing device, and the compression processing of said video compression processing device is controlled by said control means.

16. A video and audio data compression system comprising:

a compression application;

a video and audio compression processing device; and a control means for receiving compression processing commands from said compression application and controlling said video and audio compressing device, wherein said video and audio compression processing device comprises:

video compression means for compressing video data;

audio compression means for compressing audio data; and system processing means for generating system data which enables synchronous reproduction of the video and audio data, and wherein said compression application is designed to merely issues a compression parameter setting command to said control means, collectively sets parameters needed for the compression processing, continuously issues a video compression command, an audio compression command and a system processing command until the compression processing of all the video and audio data is finished, and then issues a compression end command to finish the compression processing without directly controlling the compression processing of said video compression processing device, and the compression processing of said video compression processing device is controlled by said control means.

17. A video and audio data compression system including compression processing issuing means for issuing compression processing commands in a predetermined order, and a compression processing device for performing compression processing on video and audio data, characterized by further including control means for interpreting the compression processing command issued by said compression processing issuing means to control said compression processing device, wherein said control means comprises:

compression control means for interpreting the compression processing command issued from said compression processing issuing means and controlling said compression processing device;

video compression control means for controlling video compression processing;

audio compression control means for controlling audio compression processing;

system control means for controlling system processing means for generating system data which enables synchronous reproduction of the video and audio data; and compression parameter setting means for setting the compression parameters of the video and audio data.

* * * * *